US012801388B2

(12) United States Patent
Langadi et al.

(10) Patent No.: US 12,801,388 B2
(45) Date of Patent: Nov. 17, 2026

(54) METHODS, APPARATUS, AND ARTICLES OF MANUFACTURE TO ALIGN DATA TO ADDRESS BOUNDARIES IN MEMORY

(71) Applicant: Texas Instruments Incorporated, Dallas, TX (US)

(72) Inventors: Saya Goud Langadi, Sugar Land, TX (US); Venkatesh Natarajan, Bangalore (IN); Vinod Kumar Paparaju, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/227,707

(22) Filed: Jul. 28, 2023

(65) Prior Publication Data

US 2024/0362023 A1 Oct. 31, 2024

Related U.S. Application Data

(60) Provisional application No. 63/461,653, filed on Apr. 25, 2023.

(51) Int. Cl.
*G06F 9/38* (2018.01)
*G06F 9/30* (2018.01)
*G06F 12/04* (2006.01)

(52) U.S. Cl.
CPC .............. *G06F 9/3016* (2013.01); *G06F 9/30* (2013.01); *G06F 9/30076* (2013.01); *G06F 9/30145* (2013.01); *G06F 9/30149* (2013.01); *G06F 9/3802* (2013.01); *G06F 9/3836* (2013.01); *G06F 9/3853* (2013.01)

(58) Field of Classification Search
CPC ...... G06F 9/3016; G06F 9/30; G06F 9/30076; G06F 9/30145; G06F 9/30149; G06F 9/3802; G06F 9/3836; G06F 9/3853
See application file for complete search history.

(56) References Cited

U.S. PATENT DOCUMENTS 5,819,058 A * 10/1998 Miller .................. G06F 9/3885 712/210
6,239,805 B1 5/2001 Deering
6,339,822 B1 * 1/2002 Miller .................. G06F 9/3806 712/213

(Continued)

FOREIGN PATENT DOCUMENTS

CA 2282409 A1 9/1998

OTHER PUBLICATIONS

International Search Report for PCT/US2024/026185 mailed Jul. 30, 2024.

(Continued)

*Primary Examiner* — Hyun Nam
(74) *Attorney, Agent, or Firm* — Michelle F. Murray; Charles F. Koch

(57) ABSTRACT

An example apparatus includes example packet decode circuitry to decode an instruction packet for programmable circuitry into at least one instruction. Additionally, the example apparatus includes example instruction mapping circuitry to disregard a pad instruction included in the at least one instruction, the pad instruction having not been assigned to any functional unit of the programmable circuitry.

19 Claims, 9 Drawing Sheets

(56) References Cited

U.S. PATENT DOCUMENTS

| | | | | |
|---|---|---|---|---|
| 6,460,116 | B1 * | 10/2002 | Mahalingaiah | G06F 12/0875 711/212 |
| 7,039,790 | B1 * | 5/2006 | Simar, Jr. | G06F 9/3885 712/E9.046 |
| 9,697,004 | B2 * | 7/2017 | Kageyama | G06F 9/30145 |
| 10,175,989 | B2 * | 1/2019 | Ayrignac | G06F 9/3856 |
| 12,614,445 | B1 * | 4/2026 | Squire | G08B 21/24 |
| 2003/0128140 | A1 * | 7/2003 | Xie | H03M 7/30 341/107 |
| 2007/0106883 | A1 * | 5/2007 | Choquette | G06F 9/30038 712/225 |
| 2008/0028189 | A1 * | 1/2008 | Hoogerbrugge | G06F 9/3017 712/E9.055 |
| 2015/0378737 | A1 * | 12/2015 | Debbage | G06F 12/0875 712/225 |
| 2017/0083314 | A1 * | 3/2017 | Burger | G06F 11/36 |
| 2017/0083321 | A1 * | 3/2017 | Burger | G06F 11/36 |
| 2017/0083339 | A1 * | 3/2017 | Burger | G06F 11/36 |
| 2018/0300607 | A1 * | 10/2018 | Petre | G06F 1/3206 |

OTHER PUBLICATIONS

Wikipedia, “Data structure alignment,” retrieved from https://en.wikipedia.org/w/index.php?title=Data_structure_alignment&oldid=1145598548 on Jun. 21, 2023, 11 pages.

Wikipedia, “Execution unit,” retrieved from https://en.wikipedia.org/w/index.php?title=Execution_unit&oldid=1145383376 on Jun. 21, 2023, 1 page.

Wikipedia, “Instruction unit,” retrieved from https://en.wikipedia.org/w/index.php?title=Instruction_unit&oldid=1141966555 on Jun. 21, 2023, 2 pages.

Wikipedia, “NOP (code),” retrieved from https://en.wikipedia.org/w/index.php?title=NOP_(code)&oldid=1136145865 on Jun. 21, 2023, 9 pages.

Wikipedia, “Very long instruction word,” retrieved from https://en.wikipedia.org/w/index.php?title=Very_long_instruction_word&oldid=1136165675 on Jun. 21, 2023, 8 pages.

Texas Instruments, “TMS320C66x DSP CPU and Instruction Set Reference Guide,” Texas Instruments Incorporated, Nov. 2010, 1013 pages.

* cited by examiner

METHODS, APPARATUS, AND ARTICLES OF MANUFACTURE TO ALIGN DATA TO ADDRESS BOUNDARIES IN MEMORY

CROSS-REFERENCE TO RELATED APPLICATION

This patent application claims the benefit of and priority to U.S. Provisional Patent Application Ser. No. 63/461,653 filed Apr. 25, 2023, which Application is hereby incorporated herein by reference in its entirety.

TECHNICAL FIELD

This description relates generally to computer architectures and, more particularly, to methods, apparatus, and articles of manufacture to align data to address boundaries in memory.

BACKGROUND

Manufacturers of integrated circuits (ICs) have developed techniques to manufacture compact ICs that incorporate components of a computer and/or other electronic system. Such ICs are referred to as Systems on a Chip, or SoCs. Often, such SoCs include central processor units (CPUs), memory, input/output ports, and secondary storage, all on the same substrate. The memory and/or secondary storage may be implemented by random access memory (RAM), ferroelectric random-access memory (FRAM), non-exclusive OR (NOR) flash, one-time programmable read only memory (OTP ROM), among others. SoCs may be configured to act as microcontrollers that are useful for processes that can be written into a coded set of instructions that can be executed to carry out a desired process in an automated fashion.

SUMMARY

For methods, apparatus, and articles of manufacture to align data to address boundaries in memory, an example apparatus includes example packet decode circuitry to decode an instruction packet for programmable circuitry into at least one instruction. Additionally, the example apparatus includes example instruction mapping circuitry to disregard a pad instruction included in the at least one instruction, the pad instruction having not been assigned to any functional unit of the programmable circuitry.

BRIEF DESCRIPTION OF THE DRAWINGS

The same reference numbers or other reference designators are used in the drawings to designate the same or similar (functionally and/or structurally) features.

DETAILED DESCRIPTION

Figure 1:
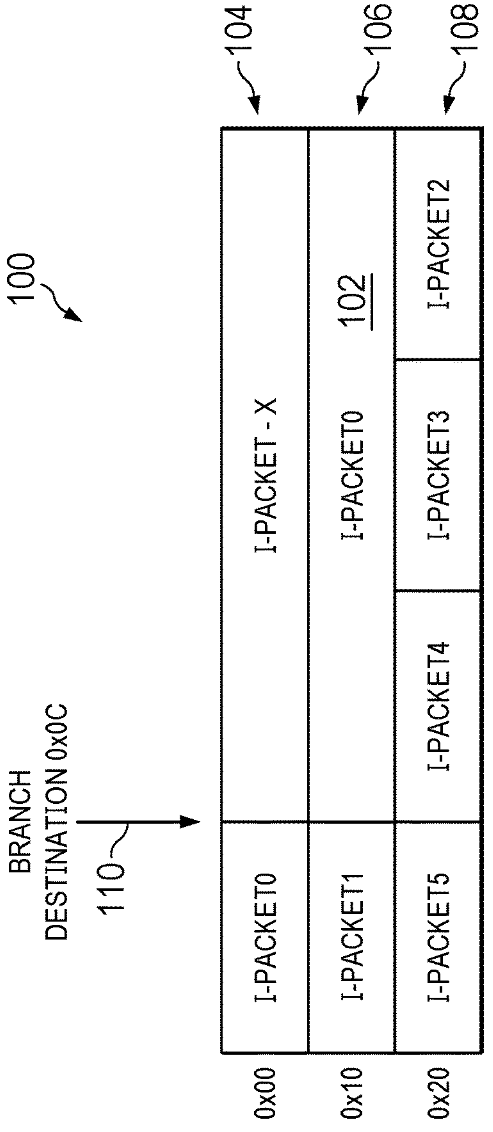
FIG. 1 illustrates an example memory including an example instruction packet that is unaligned with a width of a memory.

The drawings are not necessarily to scale. Generally, the same reference numbers in the drawing(s) and this description refer to the same or like parts. Although the drawings show regions with clean lines and boundaries, some or all of these lines and/or boundaries may be idealized. In reality, the boundaries and/or lines may be unobservable, blended and/or irregular.

Some programmable devices, such as systems on a chip (SoCs), central processor units (CPUs), etc., are designed based on a Very-Long Instruction Word (VLIW) architecture. During operation, a programmable device may execute one or more instructions utilizing programmable circuitry. Instructions may be formatted in instruction packets where an instruction packet includes one or more instructions. To comply with an example Very-Long Instruction Word architecture, each instruction packet includes at least one instruction and each instruction within an instruction packet can vary in size. In some such VLIW architectures, instruction packets are aligned to an address boundary in memory. For example, locations in memory storing instruction packets are aligned to multiples of a particular bit width (e.g., an 8-bit address boundary, a 16-bit address boundary, a 32-bit address boundary, etc.).

Furthermore, devices implementing VLIW architectures utilize a predefined bus width (e.g., program bus width, data bus width, etc.). For example, in some VLIW architectures, buses (e.g., the program bus, the data bus, etc.) are 128 bits wide. As such, in devices implementing such VLIW architectures, programmable circuitry (e.g., CPU) can fetch as much data as can be supported by the bus (e.g., the program bus width, the data bus width, etc.) from memory every clock cycle. However, on a discontinuity (e.g., a branch instruction, a call, an interrupt, etc.) in a program, the destination address associated with the discontinuity may not be aligned with the width of the bus (e.g., the program bus, the data bus, etc.). For example, destination addresses that are aligned with the 128-bit width of the bus are 0x0, 0x10, 0x20, etc. (e.g., when dividing the address value by 16, the remainder is zero) whereas destination addresses that are unaligned with the 128-bit width of the bus are 0x2, 0x4, 0x6, etc. (e.g., when dividing the address value by 16, the remainder is non-zero). In other words, the example memory is divided into 128-bit segments (e.g., rows), each of which is read from or written to as a whole.

If a destination address is unaligned with the width of the bus, then not all of the bits read over the bus will be used by the program and some data will be discarded. For example, FIG. 1 illustrates an example memory 100 including an example instruction packet 102 that is unaligned with a width of the memory 100. In the example of FIG. 1, the memory 100 includes a first example row 104, a second example row 106, and a third example row 108. In the example of FIG. 1, the memory 100 is a byte addressable memory that is 128 bits (e.g., 16 bytes) wide where instruction packets are aligned to a set of address boundaries every 16 bits within a given 128-bit row. In the example of FIG. 1, instruction packets are between 16 bits and 128 bits where individual instructions can vary in sizes of 16 bits, 32 bits, and 48 bits.

In the illustrated example of FIG. 1, the first row 104 starts at an address of 0x00 in hexadecimal representation (e.g., 0 in base 10 representation). Additionally, the second example row 106 starts at an address of 0x10 in hexadecimal representation (e.g., 16 in base 10 representation). In the example of FIG. 1, the third row 108 starts at an address of 0x20 in hexadecimal representation (e.g., 32 in base 10 representation). Furthermore, in the example of FIG. 1, the instruction packet 102 is associated with (e.g., includes) a branch instruction having an example destination address 110 of 0x0C (e.g., 12 in base 10 representation). As such, the instruction packet 102 is unaligned with the width of the memory 100 and after taking the branch, bytes 0-11 of the first row 104, corresponding to a different packet, would be unused.

Therefore, when example programmable circuitry takes the branch to the instruction packet 102, the programmable circuitry may utilize at least five clock cycles to execute the instruction packet 102. For example, the programmable circuitry execution pipeline may be a multi-stage pipeline where instructions are executed in the fourth stage. The example programmable circuitry execution pipeline includes a first stage in which the programmable circuitry requests an instruction packet from memory over the program bus, a second stage in which the instruction packet is returned from the memory and captured by the programmable circuitry, a third stage in which the programmable circuitry dispatches the instruction packet to be decoded, and a fourth stage in which the programmable circuitry executes the instruction packet when the instruction packet is available.

In the illustrated example of FIG. 1, after programmable circuitry processes the branch instruction associated with (e.g., that is part of) the instruction packet 102, the programmable circuitry requests data from the destination address 110 of 0x0C during a first clock cycle. To do so, the programmable circuitry requests data in the first row 104 which includes a 12-byte instruction packet identified as I-PACKET-X and 4 bytes of the instruction packet 102. During a second clock cycle, the programmable circuitry requests data in the second row 106 and receives the data in the first row 104. The data in the second row 106 includes the remaining 12 bytes of the instruction packet 102 and a 4-byte instruction packet identified as I-PACKET-1. In the example of FIG. 1, because the access of the data in the first row 104 is associated with the instruction packet 102, the programmable circuitry disregards the 12-byte instruction packet identified as I-PACKET-X.

In the illustrated example of FIG. 1, during a third clock cycle, the programmable circuitry receives the data in the second row 106 and attempts to dispatch the instruction packet 102 based on the data that was received during the second clock cycle. However, because the remaining 12 bytes of the instruction packet 102 have not yet been returned from the memory, the programmable circuitry cannot dispatch the instruction packet 102. As such, the programmable circuitry waits until the remaining 12 bytes of the instruction packet 102 are returned from the memory before forming the instruction packet 102. Additionally, because the access of the data in the second row 106 is associated with the instruction packet 102, the programmable circuitry may disregard the 4-byte instruction packet identified as I-PACKET-1 that follows the instruction packet 102 (e.g., if the execution does not proceed linearly).

In the illustrated example of FIG. 1, during a fourth clock cycle, the programmable circuitry attempts to dispatch the instruction packet 102 based on the data that was received during the second clock cycle and the data that was received during the third clock cycle. Because the instruction packet 102 (e.g., the entirety of the instruction packet 102) is available at the programmable circuitry (e.g., the 4 bytes of the instruction packet 102 from the first row 104 and the 12 bytes of the instruction packet 102 from the second row 106), the programmable circuitry can dispatch the instruction packet 102. During a fifth clock cycle, the programmable circuitry executes the instruction packet 102. As illustrated in the example of FIG. 1, because the instruction packet 102 is unaligned with the width of the memory 100, the programmable circuitry executes the instruction packet 102 in five clock cycles. This latency can be compounded if a discontinuity is at the start of a loop (e.g., a for loop, a while loop, etc.). For example, if a loop iterates N times, an unaligned instruction packet will increase the execution time of the loop by N cycles.

Figure 2:
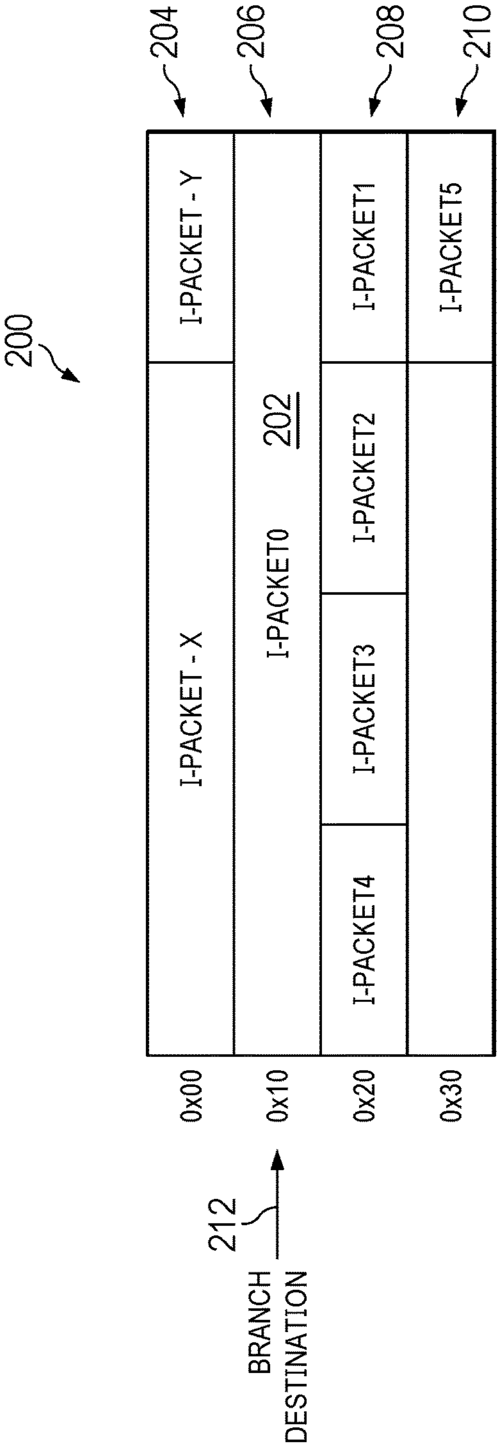
FIG. 2 illustrates an example memory including an example instruction packet that is aligned with a width of a memory.

In programmable circuitry implementing the above-described execution pipeline, the lowest number of clock cycles expended to execute an instruction packet is four clock cycles after a discontinuity. This best-case scenario is possible provided that an instruction packet is aligned with the width of the memory. For example, FIG. 2 illustrates an example memory 200 including an example instruction packet 202 that is aligned with a width of the memory 200. In the example of FIG. 2, the memory 200 includes a first example row 204, a second example row 206, a third example row 208, and a fourth example row 210. In the example of FIG. 2, the memory 200 is a byte addressable memory that is 128 bits (e.g., 16 bytes) wide where instruction packets are aligned to a 16-bit address boundary. In the example of FIG. 2, instruction packets are between 16 bits and 128 bits where individual instructions can vary in sizes of 16 bits, 32 bits, and 48 bits.

In the illustrated example of FIG. 2, the first row 204 starts at an address of 0x00 in hexadecimal representation (e.g., 0 in base 10 representation). Additionally, the second example row 206 starts at an address of 0x10 in hexadecimal representation (e.g., 16 in base 10 representation). In the example of FIG. 2, the third row 208 starts at an address of 0x20 in hexadecimal representation (e.g., 32 in base 10 representation). Additionally, the fourth example row 210 starts at an address of 0x30 in hexadecimal representation (e.g., 48 in base 10 representation). Furthermore, in the example of FIG. 2, the instruction packet 202 is associated with a branch instruction having an example destination address 212 of 0x10 (e.g., 16 in base 10 representation). As such, the instruction packet 202 is aligned with the width of the memory 200. Therefore, when programmable circuitry reaches the branch instruction, the programmable circuitry will execute the instruction packet 202 in four clock cycles as compared to the five clock cycles expended to execute the instruction packet 102, which is unaligned with the width of the memory 100.

For example, in the illustrated example of FIG. 2, after programmable circuitry processes the branch instruction associated with the instruction packet 202, the programmable circuitry requests data from the destination address 212 of 0x10 during a first clock cycle. To do so, the programmable circuitry requests data in the second row 206 which includes the instruction packet 202. During a second clock cycle, the programmable circuitry receives the data in the second row 206. As the data in the second row 206 only includes the instruction packet 202, the programmable circuitry does not disregard any of the data from the second row 206.

In the illustrated example of FIG. 2, during a third clock cycle, the programmable circuitry attempts to dispatch the instruction packet 202 based on the data that was received during the second clock cycle. Because the instruction packet 202 (e.g., the entirety of the instruction packet 202) has been returned from the memory, the programmable circuitry successfully dispatches the instruction packet 202 during the third clock cycle. During a fourth clock cycle, the programmable circuitry executes the instruction packet 202. As illustrated in the example of FIG. 2, because the instruction packet 202 is aligned with the width of the memory 200, the programmable circuitry can execute the aligned instruction packet in four clock cycles as compared to the at least five clock cycles expended to execute the instruction packet 102, which is unaligned with the width of the memory 100. As such, programmable circuitry performance is improved when instruction packets are aligned with the width of memory at least because the number of clock cycles expended to execute an aligned instruction packet is reduced as compared to the number of clock cycles expended to execute an unaligned instruction packet.

To reduce the number of clock cycles expended by programmable circuitry to execute an unaligned instruction packet, some programmable device architectures have inserted no operation (NOP) instructions in memory to align the unaligned instruction packet. A NOP instruction is an instruction with the explicit purpose of not changing the state of any of the program-accessible components (e.g., registers, status flags, memory, etc.). NOP instructions are most commonly used for timing purposes, to force memory alignment, to prevent hazards, to occupy a branch delay slot, to render an existing instruction void such as a jump instruction, or as a target of an execute instruction. Additionally, NOP instructions can have minor side effects such as causing an execution pipeline of programmable circuitry to synchronize.

In some examples, when a NOP instruction in memory is encountered, the programmable circuitry assigns the NOP instruction to a functional unit of the programmable circuitry. As such, NOP instructions in memory may be limited to a particular size that corresponds to the size of a functional unit of the programmable circuitry. For example, if the size of a functional unit is 16 bits, a NOP instruction may also be 16 bits. Functional units of programmable circuitry can be designed to accommodate multiple sizes of NOP instructions, but a tradeoff to do so may be that additional space within the limited footprint of the programmable circuitry is to be reserved to accommodate the multiple sizes. As such, NOP instructions may be inflexible in that a NOP instruction can only be assigned to a functional unit having a size that matches the size of the NOP instruction, and if a developer of programmable circuitry wants to accommodate a variety of NOP instructions sizes, the programmable circuitry sacrifices space that would otherwise be relegated to different function(s).

Additionally, because NOP instructions are assigned to a functional unit of programmable circuitry, the programmable circuitry executes NOP instructions in a defined number of clock cycles. Accordingly, the number of clock cycles used to align an unaligned instruction packet with NOP instructions depends on the number of NOP instructions that are inserted to align the unaligned instruction packet. As such, despite reducing the number of clock cycles expended to execute an unaligned instruction packet, inserting NOP instructions into memory to compensate for the unaligned instruction packet still results in programmable circuitry expending excess clock cycles than would otherwise be expended to execute aligned instruction packets. Furthermore, utilizing NOP instructions is disadvantageous for the code density of a program and degrades timing.

To ensure that unaligned instruction packets are executed by programmable circuitry within reduced clock cycles (e.g., the same number of clock cycles expended to execute aligned instruction packets), examples disclosed herein include a new instruction referred to herein as a PAD instruction. A PAD instruction is a 16-bit instruction that can be multiplied many times in the same instruction packet to create a padding anywhere from 16 to 128 bits. Additionally, when processing a PAD instruction, programmable circuitry does not assign the PAD instruction to a functional unit. Because a PAD instruction is variable in size and is not assigned to a functional unit (unlike NOP instructions which may be limited to fixed sizes and are assigned to a functional unit), example PAD instructions disclosed herein can be added to instruction packets to cause unaligned instruction packets to be executed by programmable circuitry without expending excess clock cycles.

Figure 3:
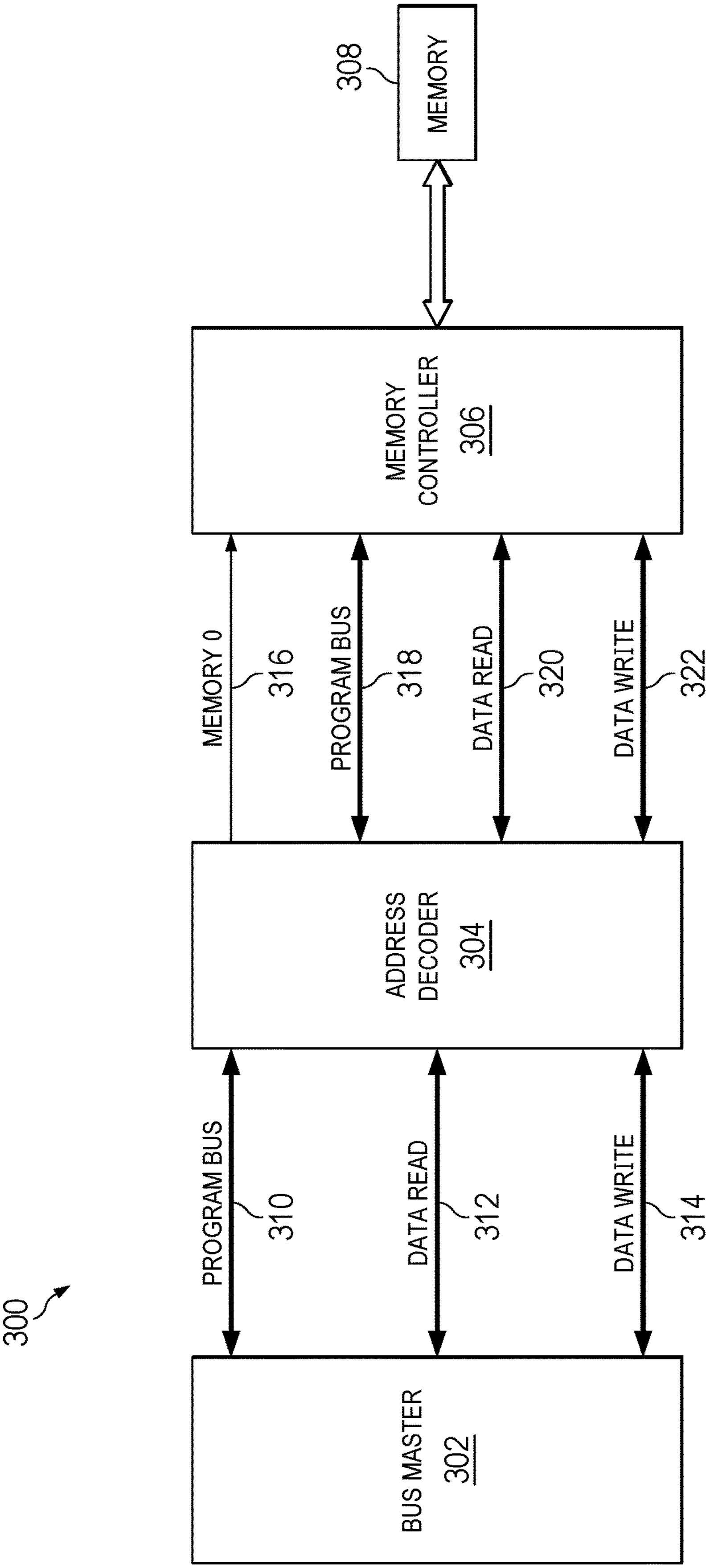
FIG. 3 is a block diagram illustrating an example system on a chip (SoC) implemented in accordance with example PAD instructions disclosed herein.

FIG. 3 is a block diagram illustrating an example system on a chip (SoC) 300 implemented in accordance with example PAD instructions disclosed herein. In the example of FIG. 3, the SoC 300 includes an example bus master 302, an example address decoder 304, an example memory controller 306, and an example memory 308. The example bus master 302 of FIG. 3 includes dual purpose terminals (e.g., input and/or output terminals). As used herein, the term dual purpose terminal refers to a terminal that includes two purposes. For example, dual purpose terminals can operate as both an input terminal and an output terminal.

In the illustrated example of FIG. 3, the address decoder 304 includes first dual purpose terminals, second dual purpose terminals, and output terminals. In the example of FIG. 3, the memory controller 306 includes dual purpose terminals, first input terminals, second input terminals, and output terminals. In the example of FIG. 3, the memory 308 includes input terminals and output terminals. As used herein, the term dual purpose terminal may be substituted for input terminal and/or output terminal depending on whether the component including the dual purpose terminal is transmitting or receiving data. Additionally, in some examples, terminal may be omitted from the terms input terminal, output terminal, and dual purpose terminal.

In the illustrated example of FIG. 3, the dual purpose terminals of the bus master 302 are coupled to the first dual purpose terminals of the address decoder 304 via an example program bus 310, an example data read bus 312, and an example data write bus 314. In the example of FIG. 3, the output terminals of the address decoder 304 are coupled to the first input terminals of the memory controller 306 via an example memory request channel 316. In the example of FIG. 3, the second dual purpose terminals of the address decoder 304 are coupled to the dual purpose terminals of the memory controller 306 via an example memory program bus 318, an example memory data read bus 320, and an example memory data write bus 322. The output terminals of the memory controller 306 are coupled to the memory 308 via an example bus. The second input terminals of the memory controller 306 are coupled to the output terminals of the memory 308 via an example bus.

In the illustrated example of FIG. 3, the bus master 302 is implemented by a CPU designed based on a VLIW architecture. In alternative examples, the bus master 302 may be implemented by any other type of programmable circuitry such as one or more accelerators (e.g., one or more control law accelerators (CLAs), one or more background CRC (BGCRC) units, one or more Ethernet media access controllers (EMACs), etc.). In the example of FIG. 3, the bus master 302 includes one or more functional units. An example functional unit is a component of programmable circuitry (e.g., a CPU) that performs operations and/or calculations forwarded to the programmable circuitry. Example functional units include an arithmetic logic unit (ALU), a floating-point unit (FPU), an address generation unit (AGU), a load-store unit (LSU), a fast integer division (FINTDIV) unit, a trigonometric math unit (TMU), a Viterbi, complex math, and cyclic redundancy check (CRC) unit (VCU), among others.

In the illustrated example of FIG. 3, the bus master 302 includes 17 functional units where eight functional units can execute an instruction in parallel. Additionally, in the example of FIG. 3, a functional unit of the bus master 302 can execute a 16-bit instruction. The example bus master 302 of FIG. 3 executes one or more programs and/or instructions according to a use-case in which the SoC 300 is implemented. To execute the program(s) and/or instruction(s), the bus master 302 accesses the memory 308 (e.g., via the address decoder 304 and/or the memory controller 306) to obtain one or more instruction packets.

As described below, the memory 308 of the example of FIG. 3 may include one or more PAD instructions to align instruction packets that would otherwise be unaligned with the width of the memory 308. For example, a compiler and/or an assembler, which may be implemented outside of the SoC 300, can insert one or more PAD instructions into a program before the program is stored in the memory 308 of the SoC 300. To insert PAD instructions into a program, the compiler and/or the assembler (1) identifies a discontinuity (e.g., a branch instruction, a call, an interrupt, etc.) in a program and (2) determines whether an instruction packet preceding and/or following a destination address associated with the discontinuity is unaligned with the width of the memory 308. For example, discontinuities are often present in loops (e.g., for loops, while loops, etc.) where a branch instruction at the end of the loop directs a CPU to return to an earlier instruction (e.g., a destination address in memory) and repeat the one or more instructions that are a part of the loop. If an instruction packet preceding and/or following the destination address is unaligned with the width of the memory 308, then the compiler and/or the assembler inserts one or more PAD instructions into the instruction packet and/or as another instruction packet (e.g., a PAD instruction packet) preceding the instruction packet to cause the instruction packet to be aligned with the width of the memory 308. Advantageously, when the bus master 302 encounters a PAD instruction, the bus master 302 disregards the PAD instruction and does not assign the PAD instruction to a functional unit of the bus master 302. As such, the bus master 302 does not waste clock cycles executing instructions that are included for purposes of memory alignment.

In the illustrated example of FIG. 3, the address decoder 304 is implemented by logic circuitry (e.g., sequential logic circuitry and/or combinational logic circuitry). In additional or alternative examples, the address decoder 304 may be implemented by hardware, firmware, and/or software. In the example of FIG. 3, the address decoder 304 routes address and/or control information (e.g., memory address(es), data to be written, etc.) to the memory controller 306. For example, the memory 308 may include a base address according to a memory map of the SoC 300 and individual memory cells within the memory 308 may be accessed via an offset address to the respective base addresses. In the example of FIG. 3, the address decoder 304 determines the base address of the requested memory based on the information transmitted to the address decoder 304 on the program bus 310, the data read bus 312, and/or the data write bus 314.

In the illustrated example of FIG. 3, the memory controller 306 is implemented by logic circuitry (e.g., sequential logic circuitry and/or combinational logic circuitry). In additional or alternative examples, the memory controller 306 is implemented by an integrated memory controller (IMC), a memory chip controller (MCC), a memory controller unit (MCU), and/or a memory management unit (MMU), among others. In the example of FIG. 3, the memory controller 306 controls when and which components of the SoC 300 (e.g., the bus master 302 and/or any other bus masters of the SoC 300) access the memory 308. For example, when the bus master 302 requests control of the buses (e.g., the memory program bus 318, the memory data read bus 320, the memory data write bus 322), the bus master 302 may request access via the memory request channel 316. In the example of FIG. 3, the memory request channel 316 may be implemented using any suitable hardware (e.g., wire, optical fiber, etc.) and/or software (e.g., communication protocols, etc.) communication technique to request access to the memory 308.

In the illustrated example of FIG. 3, the memory controller 306 arbitrates requests from components of the SoC 300 and generates signals to access the memory 308. For example, the memory controller 306 determines which of the components of the SoC 300 (e.g., the bus master 302 and/or any other bus masters of the SoC 300) can access the buses based on the priority of one or more components of the SoC 300, the fairness of serving the requesting components of the SoC 300 with respect to other components of the SoC 300, and/or whether the buses are currently in use. The memory controller 306 can employ daisy chain, polling, and/or independent requests to serve connected components of the SoC 300. In the example of FIG. 3, after arbitrating which of the components of the SoC 300 is to access the memory 308, the memory controller 306 generates one or more signals to access the memory 308. For example, the memory controller 306 may enable access to the memory 308 via a memory enable signal. Additionally, the memory controller 306 may access the memory 308 via an offset address to a base address of the memory 308. For example, the base address is hardcoded at the memory controller 306.

In the illustrated example of FIG. 3, the memory 308 is implemented by a memory storage array such as a programmable logic array, field programmable gate array, among others. For example, the memory 308 may be implemented as a dynamic random access memory (RAM) (DRAM), static RAM (SRAM), one or more hard drives, etc. The memory 308 includes word-lines and bit-lines that operate as designators for row-column pairs. The memory controller 306 selects specific address information in the memory 308 to read and/or write data based on information received from the address decoder 304.

In the illustrated example of FIG. 3, the memory 308 is DRAM and as such includes several switches and capacitors. The switches may be transistors such as metal oxide semiconductor field effect transistors (MOSFET), bipolar junction transistors (BJT), junction gate field effect transistors (JFET), heterojunction bipolar transistors (HBT), etc. The usage of a transistor and capacitor together forms a memory cell which corresponds to a single bit of data. Word-lines and bit-lines of the memory 308 specify the location of individual memory cells from which to read and/or in which to store data. In additional or alternative examples, the memory 308 can be implemented by read-only memory (ROM), flash memory, and/or any other type of memory.

In the illustrated example of FIG. 3, the program bus 310 may be implemented using any suitable hardware (e.g., wire, optical fiber, etc.) and/or software (e.g., communication protocols, etc.) communication technique to transmit instructions, addresses, and/or operands to the memory 308. For example, the program bus 310 is implemented as an internal bus within the SoC 300. In the example of FIG. 3, the width of the program bus 310 that is dedicated to transmitting instructions, addresses, and/or operands is 128 bits. Additionally, the program bus 310 includes a number of conductors to transmit sideband error correcting code (ECC) and/or parity code for address, data, and control information. In the example of FIG. 3, the memory program bus 318 may be implemented using any suitable hardware (e.g., wire, optical fiber, etc.) and/or software (e.g., communication protocols, etc.) communication technique to transmit information on the program bus 310 between the memory 308 and the requesting component of the SoC 300 (e.g., the bus master 302). For example, the memory program bus 318 is implemented as an internal bus within the SoC 300. In the example of FIG. 3, the width of the memory program bus 318 that is dedicated to transmitting information on the program bus 310 is 128 bits. Additionally, the memory program bus 318 includes a number of conductors to transmit ECC and/or parity code.

In the illustrated example of FIG. 3, the data read bus 312 may be implemented using any suitable hardware (e.g., wire, optical fiber, etc.) and/or software (e.g., communication protocols, etc.) communication technique to transmit operands read from the memory 308 and/or corresponding addresses. For example, the data read bus 312 is implemented as an internal bus within the SoC 300. In the example of FIG. 3, the width of the data read bus 312 that is dedicated to transmitting operands read from the memory 308 and/or corresponding addresses is 128 bits. Additionally, the data read bus 312 includes a number of conductors to transmit sideband ECC and/or parity code for address, data, and control information. In the example of FIG. 3, the memory data read bus 320 may be implemented using any suitable hardware (e.g., wire, optical fiber, etc.) and/or software (e.g., communication protocols, etc.) communication technique to transmit information on the data read bus 312 between the memory 308 and the requesting component of the SoC 300 (e.g., the bus master 302). For example, the memory data read bus 320 is implemented as an internal bus within the SoC 300. In the example of FIG. 3, the width of the memory data read bus 320 that is dedicated to transmitting information on the data read bus 312 is 128 bits. Additionally, the memory data read bus 320 includes a number of conductors to transmit ECC and/or parity code.

In the illustrated example of FIG. 3, the data write bus 314 may be implemented using any suitable hardware (e.g., wire, optical fiber, etc.) and/or software (e.g., communication protocols, etc.) communication technique to transmit data to be written to the memory 308 and/or corresponding addresses. For example, the data write bus 314 is implemented as an internal bus within the SoC 300. The data write bus 314 additionally transmits sideband ECC and/or parity code for address, data, and control information. In the example of FIG. 3, the memory data write bus 322 may be implemented using any suitable hardware (e.g., wire, optical fiber, etc.) and/or software (e.g., communication protocols, etc.) communication technique to transmit information on the data write bus 314 between the memory 308 and the requesting component of the SoC 300. For example, the memory data write bus 322 is implemented as an internal bus within the SoC 300. As described above, the various buses of the SoC 300 reserve 128 bits for transmitting information to and/or from the bus master 302. As such, the bus master 302 can fetch up to 128 bits from the memory 308 every clock cycle.

In the illustrated example of FIG. 3, the memory 308 stores one or more instruction packets. An example instruction packet is between 16 bits and 128 bits where an instruction of the instruction packet can vary in sizes of 16 bits, 32 bits, and 48 bits. As such, an instruction packet can include between one instruction and eight instructions. In the example of FIG. 3, the width of the memory 308 that is dedicated to instruction packets is 128 bits. Example instruction packets are aligned to a 16-bit address boundary (e.g., because the minimum instruction packet size is 16 bits) in the memory 308. In the example of FIG. 3, the memory 308 is byte addressable meaning that aligned addresses are quantized in multiples of two bytes (e.g., 0x0, 0x2, 0x4, etc. in hexadecimal representation). Advantageously, the memory 308 includes one or more PAD instructions to reduce the number of instruction packets that are unaligned with the width of the program bus 310 and/or the data read bus 312. As such, the example bus master 302 of FIG. 3 can access instruction packets that would otherwise be unaligned with the memory 308 with reduced clock cycles (e.g., the same number of clock cycles used to execute aligned instruction packets).

Figure 4:
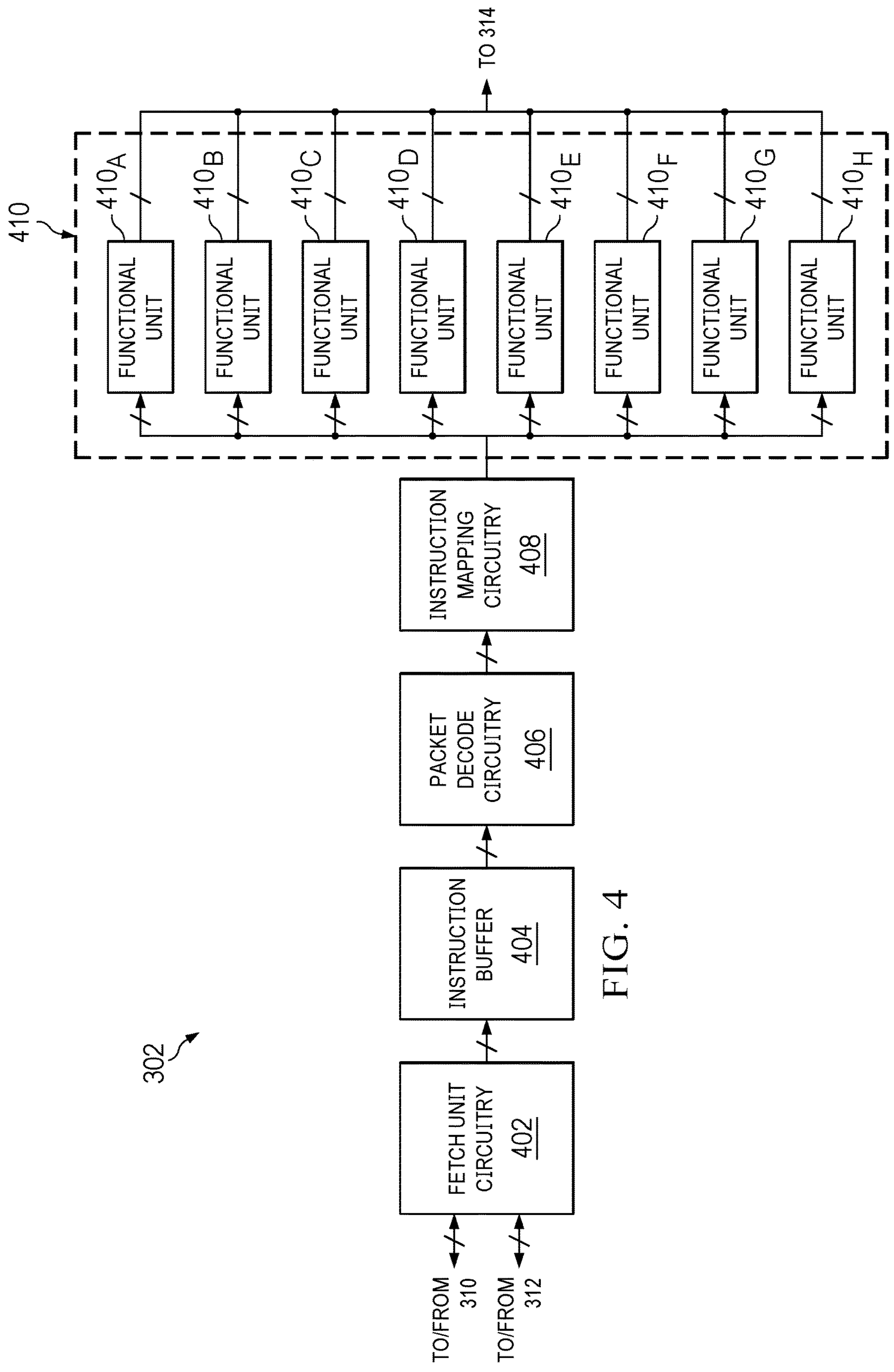
FIG. 4 is a block diagram illustrating an example implementation of the bus master of FIG. 3 to operate in accordance with example PAD instructions disclosed herein.

FIG. 4 is a block diagram illustrating an example implementation of the bus master 302 of FIG. 3 to operate in accordance with example PAD instructions disclosed herein. In the example of FIG. 4, the bus master 302 may be instantiated (e.g., creating an instance of, bring into being for any length of time, materialize, implement, etc.) by programmable circuitry such as a Central Processor Unit (CPU) executing first instructions. Additionally or alternatively, the bus master 302 of FIG. 4 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 4 may, thus, be instantiated at the same or different times. Some or all of the circuitry of FIG. 4 may be instantiated, for example, in one or more threads executing concurrently on hardware and/or in series on hardware. Moreover, in some examples, some or all of the circuitry of FIG. 4 may be implemented by microprocessor circuitry executing instructions and/or FPGA circuitry performing operations to implement one or more virtual machines and/or containers.

In the illustrated example of FIG. 4, the bus master 302 includes example fetch unit circuitry 402, an example instruction buffer 404, example packet decode circuitry 406, example instruction mapping circuitry 408, and example functional units 410. For example, the functional units 410 include a first example functional unit $\mathbf{410}_A$, a second example functional unit $\mathbf{410}_B$, a third example functional unit $\mathbf{410}_C$, a fourth example functional unit $\mathbf{410}_D$, a fifth example functional unit $\mathbf{410}_E$, a sixth example functional unit $\mathbf{410}_F$, a seventh example functional unit $\mathbf{410}_G$, and an eighth example functional unit $\mathbf{410}_H$. Although eight functional units are illustrated in FIG. 4, the bus master 302 may include 17 functional units as described above in connection with FIG. 3.

In the illustrated example of FIG. 4, the fetch unit circuitry 402 includes first dual purpose (e.g., input/output) terminals, second dual purpose terminals, and output terminals. In the example of FIG. 4, the instruction buffer 404 includes input terminals and output terminals. The example packet decode circuitry 406 of FIG. 4 includes input terminals and output terminals. In the example of FIG. 4, the instruction mapping circuitry 408 includes input terminals and multiple groups of output terminals. For example, the instruction mapping circuitry 408 includes the same number of groups of output terminals as the number of the functional units 410. Additionally, each of the functional units 410 includes input terminals and output terminals.

In the illustrated example of FIG. 4, the first dual purpose terminals, the second dual purpose terminals, and the output terminals of the fetch unit circuitry 402 can support 128 bits of data. In the example of FIG. 4, the first dual purpose terminals of the fetch unit circuitry 402 are coupled to the program bus 310. Additionally, the second dual purpose terminals of the example fetch unit circuitry 402 of FIG. 4 are coupled to the data read bus 312. In the example of FIG. 4, the output terminals of the fetch unit circuitry 402 are coupled to the input terminals of the instruction buffer 404.

In the illustrated example of FIG. 4, the input terminals and the output terminals of the instruction buffer 404 can support 128 bits of data. In the example of FIG. 4, the input terminals of the instruction buffer 404 are coupled to the output terminals of the fetch unit circuitry 402. Additionally, the output terminals of the instruction buffer 404 are coupled to the input terminals of the instruction mapping circuitry 408. In the example of FIG. 4, the input terminals of the instruction mapping circuitry 408 can support 128 bits of data. Additionally, each group of output terminals of the instruction mapping circuitry 408 can support 48 bits of data. In the example of FIG. 4, the input terminals of the instruction mapping circuitry 408 are coupled to the output terminals of the packet decode circuitry 406. Each group of output terminals of the example instruction mapping circuitry 408 of FIG. 4 is coupled to the input terminals of a respective one of the functional units 410.

In the illustrated example of FIG. 4, the input terminals of a respective ones of the functional units 410 can support 48 bits of data. In the example of FIG. 4, the input terminals of a respective one of the functional units 410 are coupled to a respective group of output terminals of the instruction mapping circuitry 408. Additionally, in the example of FIG. 4, the output terminals of a respective one of the functional units 410 are coupled to the data write bus 314.

In the illustrated example of FIG. 4, the fetch unit circuitry 402 is implemented by logic circuitry (e.g., sequential logic circuitry and/or combinational logic circuitry). In additional or alternative examples, the fetch unit circuitry 402 may be implemented by hardware, firmware, and/or software. In some examples, the fetch unit circuitry 402 is instantiated by programmable circuitry executing fetch unit instructions and/or configured to perform operations such as those represented by the flowchart(s) of FIG. 11. In the example of FIG. 4, the fetch unit circuitry 402 requests one or more instruction packets from the memory 308 via the program bus 310. For example, during a first clock cycle of the bus master 302, the fetch unit circuitry 402 requests an instruction packet from the memory 308 via the program bus 310.

In the illustrated example of FIG. 4, the fetch unit circuitry 402 accesses (e.g., receives) one or more instruction packets from the memory 308 via the data read bus 312. For example, during a second clock cycle of the bus master 302, the fetch unit circuitry 402 accesses an instruction packet from the memory 308 via the data read bus 312 and stores (e.g., causes storage of) the instruction packet in the instruction buffer 404. As described below, example PAD instructions described herein reduce the number of instruction packets that are not aligned with the bit width of the memory 308. As such, when aligned, the fetch unit circuitry 402 can access an instruction packet from the memory 308 in one clock cycle. Additionally, the example fetch unit circuitry 402 dispatches one or more instruction packets from the instruction buffer 404 to the packet decode circuitry 406. For example, during a third clock cycle of the bus master 302, the fetch unit circuitry 402 dispatches an instruction packet from the instruction buffer 404 to the packet decode circuitry 406 when the instruction packet is present in the instruction buffer 404.

In some examples, the bus master 302 includes means for fetching. For example, the means for fetching may be implemented by the fetch unit circuitry 402. In some examples, the fetch unit circuitry 402 may be instantiated by programmable circuitry such as the example programmable circuitry 1212 of FIG. 12. For example, the fetch unit circuitry 402 may be instantiated by an example microprocessor executing machine-executable instructions such as those implemented by at least blocks 1102, 1104, and 1106 of FIG. 11. In some examples, the fetch unit circuitry 402 may be instantiated by hardware logic circuitry, which may be implemented by an ASIC, XPU, or FPGA circuitry configured and/or structured to perform operations corresponding to the machine-readable instructions. For example, an XPU may be implemented by a heterogeneous computing system including multiple types of programmable circuitry (e.g., one or more FPGAs, one or more CPUs, one or more GPUs, one or more network processing units (NPUs), one or more digital signal processors (DSPs), etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s). Additionally or alternatively, the fetch unit circuitry 402 may be instantiated by any other combination of hardware, software, and/or firmware. For example, the fetch unit circuitry 402 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

In the illustrated example of FIG. 4, the instruction buffer 404 is implemented by one or more registers and/or storage elements. In additional or alternative examples, the instruction buffer 404 can be implemented by any type of memory. In the example of FIG. 4, the instruction buffer 404 stores one or more instruction packets to be dispatched to the packet decode circuitry 406.

In the illustrated example of FIG. 4, the packet decode circuitry 406 is implemented by logic circuitry (e.g., sequential logic circuitry and/or combinational logic circuitry). In additional or alternative examples, the packet decode circuitry 406 may be implemented by hardware, firmware, and/or software. In some examples, the packet decode circuitry 406 is instantiated by programmable circuitry executing packet decode instructions and/or configured to perform operations such as those represented by the flowchart(s) of FIG. 11. In the example of FIG. 4, the packet decode circuitry 406 is implemented by combinational logic and operates with the instruction mapping circuitry 408 as described herein to decode instructions and map the instructions to one or more of the functional units 410 in the same clock cycle of the bus master 302. In additional or alternative examples, the packet decode circuitry 406 may operate asynchronously (e.g., without relying on a clock signal of the bus master 302). For example, when an instruction packet is dispatched to the packet decode circuitry 406, the packet decode circuitry 406 decodes the instruction packet into one or more instructions regardless of the value of a clock signal of the bus master 302.

In the illustrated example of FIG. 4, the packet decode circuitry 406 interprets one or more opcodes that are part of an instruction packet. For example, an instruction packet can include between one and eight instructions that are represented as opcodes. The example opcodes correspond to instructions to be executed by the functional units 410. In the example of FIG. 4, the packet decode circuitry 406 decodes the one or more instructions in opcode representation (e.g., instruction opcodes) into one or more instructions in data representation (e.g., instruction data). For example, the packet decode circuitry 406 decodes the one or more instruction opcodes into instruction data (e.g., binary instruction data) that can be used to assign the one or more instructions to one or more of the functional units 410 for execution.

In some examples, the bus master 302 includes means for decoding. For example, the means for decoding may be implemented by the packet decode circuitry 406. In some examples, the packet decode circuitry 406 may be instantiated by programmable circuitry such as the example programmable circuitry 1212 of FIG. 12. For example, the packet decode circuitry 406 may be instantiated by an example microprocessor executing machine-executable instructions such as those implemented by at least block 1108 of FIG. 11. In some examples, the packet decode circuitry 406 may be instantiated by hardware logic circuitry, which may be implemented by an ASIC, XPU, or FPGA circuitry configured and/or structured to perform operations corresponding to the machine-readable instructions. Additionally or alternatively, the packet decode circuitry 406 may be instantiated by any other combination of hardware, software, and/or firmware. For example, the packet decode circuitry 406 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

In the illustrated example of FIG. 4, the instruction mapping circuitry 408 is implemented by logic circuitry (e.g., sequential logic circuitry and/or combinational logic circuitry). In additional or alternative examples, the instruction mapping circuitry 408 may be implemented by hardware, firmware, and/or software. In some examples, the instruction mapping circuitry 408 is instantiated by programmable circuitry executing instruction mapping instructions and/or configured to perform operations such as those represented by the flowchart(s) of FIG. 11. In the example of FIG. 4, the instruction mapping circuitry 408 is implemented by combinational logic and operates with the packet decode circuitry 406 as described herein to map instructions decoded by the packet decode circuitry 406 to one or more of the functional units 410 in the same clock cycle of the bus master 302. In additional or alternative examples, the instruction mapping circuitry 408 may operate asynchronously (e.g., without relying on a clock signal of the bus master 302). For example, when one or more instructions are available to the instruction mapping circuitry 408, the instruction mapping circuitry 408 maps the one or more instructions to one or more of the functional units 410 regardless of the value of a clock signal of the bus master 302.

In the illustrated example of FIG. 4, the instruction mapping circuitry 408 processes the one or more instructions in data representation to assign the one or more instructions to one or more of the functional units 410. For example, an instruction (e.g., an instruction in data representation) that is to be assigned to one of the functional units 410 includes a mapping section (e.g., between one and 15 bits) indicating one or more of the functional units 410 to which the instruction is to be assigned. Additionally, the remaining portion of an instruction (e.g., an instruction in data representation) includes the data to be processed by the one or more of the functional units 410 to which the instruction is assigned.

In the illustrated example of FIG. 4, to assign an instruction to a functional unit, the instruction mapping circuitry 408 parses the instruction data to identify the mapping section of the instruction data. Based on the mapping section of the instruction data, the instruction mapping circuitry 408 maps the instruction to one or more of the functional units 410. In the example of FIG. 4, the instruction mapping circuitry 408 can be implemented by one or more demultiplexers where the mapping section of instructions are used to select the output of the one or more demultiplexers. In some examples, the instruction mapping circuitry 408 can be implemented by multiple instances of the instruction mapping circuitry 408 (e.g., multiple instruction mapping circuits). For example, each of the functional units 410 can be associated with a dedicated instance of the instruction mapping circuitry 408 where the dedicated instance of the instruction mapping circuitry 408 maps an instruction to a corresponding functional unit if the instruction includes a mapping section that corresponds to the functional unit to which the instance of the instruction mapping circuitry 408 is dedicated.

In some examples, the bus master 302 includes means for mapping. For example, the means for mapping may be implemented by the instruction mapping circuitry 408. In some examples, the instruction mapping circuitry 408 may be instantiated by programmable circuitry such as the example programmable circuitry 1212 of FIG. 12. For example, the instruction mapping circuitry 408 may be instantiated by an example microprocessor executing machine-executable instructions such as those implemented by at least blocks 1110, 1112, and 1114 of FIG. 11. In some examples, the instruction mapping circuitry 408 may be instantiated by hardware logic circuitry, which may be implemented by an ASIC, XPU, or FPGA circuitry configured and/or structured to perform operations corresponding to the machine-readable instructions. Additionally or alternatively, the instruction mapping circuitry 408 may be instantiated by any other combination of hardware, software, and/or firmware. For example, the instruction mapping circuitry 408 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

As described above, when the bus master 302 encounters a PAD instruction, the bus master 302 disregards the PAD instruction and does not assign the PAD instruction to a functional unit of the bus master 302. Accordingly, in some examples, the packet decode circuitry 406 removes any PAD instructions from a set of instructions within an instruction packet before the set of instructions is provided to the instruction mapping circuitry 408. Additionally or alternatively, the instruction mapping circuitry 408 may discard any PAD instructions received from the packet decode circuitry 406 in the process of allocating instructions among the functional units 410. In that regard, a PAD instruction is an instruction with the explicit purpose of not being assigned to a functional unit of programmable circuitry. An example PAD instruction described herein is a 16-bit instruction that can be instantiated multiple times within the same instruction packet.

Figure 5:
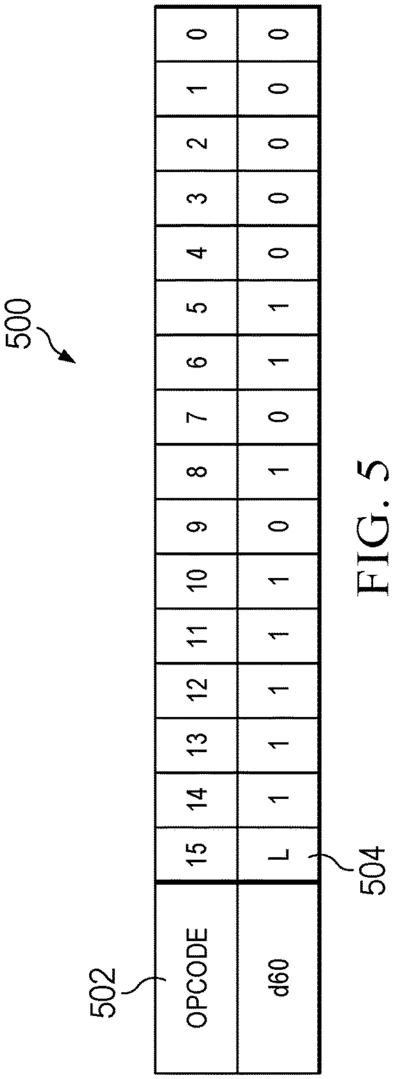
FIG. 5 illustrates an example 16-bit PAD instruction.

For example, FIG. 5 illustrates an example 16-bit PAD instruction 500. The PAD instruction 500 of the example of FIG. 5 includes an example opcode 502. In the example of FIG. 5, the opcode 502 is d60. As such, when the packet decode circuitry 406 receives the opcode d60, the packet decode circuitry 406 decodes the opcode into data (e.g., such as the data illustrated in FIG. 5). In the example of FIG. 5, an example $16^{th}$ bit 504 of the PAD instruction 500 is reserved to indicate whether the PAD instruction 500 is the last instruction of an instruction packet. For example, a value of 0 in the $16^{th}$ bit 504 of the PAD instruction 500 indicates that the PAD instruction 500 is the last instruction in an instruction packet and a value of 1 in the $16^{th}$ bit 504 of the PAD instruction 500 indicates that the PAD instruction 500 is not the last instruction in the instruction packet.

As illustrated in FIG. 5, the PAD instruction 500 does not include a mapping section. As such, during instruction mapping to functional units of the bus master 302, the instruction mapping circuitry 408 does not map PAD instructions to any functional unit of the bus master 302. Instead, the instruction mapping circuitry 408 disregards example PAD instructions and therefore conserves clock cycles (e.g., by causing the bus master 302 to not execute the PAD instructions). In additional or alternative examples, a PAD instruction may be implemented such that the PAD instruction includes a mapping section. In such examples, the mapping section of a PAD instruction can include data that does not correspond to a functional unit of the bus master 302. For example, the mapping section of the PAD instruction can include data that will not cause the instruction mapping circuitry 408 to map the PAD instruction to a functional unit.

Figure 6:
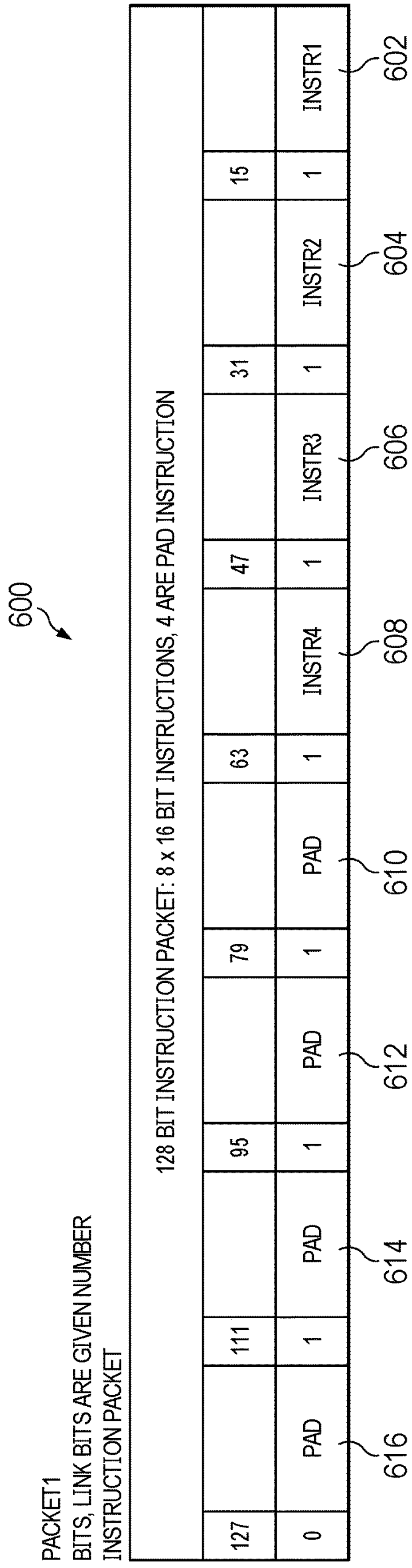
FIG. 6 illustrates an example instruction packet including four PAD instructions.
Figure 7:
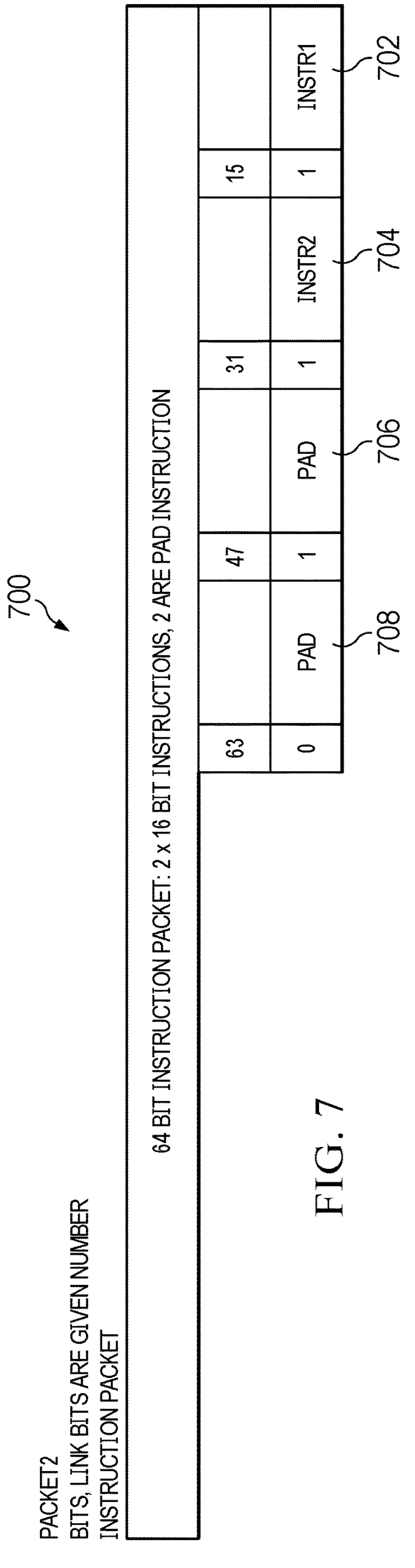
FIG. 7 illustrates an example instruction packet including two PAD instructions.

FIGS. 6-7 illustrate instruction packets including different numbers of PAD instructions. Instruction packets may include varying numbers of PAD instructions or no PAD instructions so that adjacent instruction packets (e.g., immediately subsequent instruction packets) are aligned with address boundaries of a memory. FIG. 6 illustrates an example instruction packet 600 including four PAD instructions. In the example of FIG. 6, the instruction packet 600 is a 128-bit instruction packet including eight 16-bit instructions, four of which are PAD instructions. For example, the instruction packet 600 includes a first example instruction 602 to be executed by a functional unit, a second example instruction 604 to be executed by a functional unit, a third example instruction 606 to be executed by a functional unit, and a fourth example instruction 608 to be executed by a functional unit. Additionally, for example, the instruction packet 600 includes a first example PAD instruction 610, a second example PAD instruction 612, a third example PAD instruction 614, and a fourth example PAD instruction 616.

In the illustrated example of FIG. 6, the first instruction 602, the second instruction 604, the third instruction 606, the fourth instruction 608, the first PAD instruction 610, the second PAD instruction 612, the third PAD instruction 614, and the fourth PAD instruction 616 reserve one bit to indicate whether an additional instruction is included in the instruction packet 600. For example, the $16^{th}$ bit of the first instruction 602, the second instruction 604, the third instruction 606, the fourth instruction 608, the first PAD instruction 610, the second PAD instruction 612, the third PAD instruction 614, and the fourth PAD instruction 616 indicate whether an instruction is the last instruction in the instruction packet 600. In the example of FIG. 6, a value of 1 as the $16^{th}$ bit of an instruction indicates that an additional instruction is included in an instruction packet. Conversely, in the example of FIG. 6, a value 0 as the $16^{th}$ bit of an instruction indicates that no additional instruction is included in an instruction packet.

As illustrated in the example of FIG. 6, the first PAD instruction 610, the second PAD instruction 612, the third PAD instruction 614, and the fourth PAD instruction 616 align an instruction packet following the instruction packet 600 with a 128-bit wide memory (e.g., the memory 308 of FIG. 3). For example, if an instruction packet following the instruction packet 600 is more than 64 bits in length, the instruction packet following the instruction packet 600 will be unaligned with the 128-bit wide memory. Advantageously, by including the first PAD instruction 610, the second PAD instruction 612, the third PAD instruction 614, and the fourth PAD instruction 616 in the instruction packet 600, examples described herein align an instruction packet following the instruction packet 600 with the 128-bit wide memory such that the following instruction packet can be accessed from the memory in one clock cycle.

In the illustrated example of FIG. 6, the first instruction 602, the second instruction 604, the third instruction 606, and the fourth instruction 608 include respective mapping sections that identify a functional unit to which the first instruction 602, the second instruction 604, the third instruction 606, and the fourth instruction 608 are to be assigned.

Additionally, the first PAD instruction 610, the second PAD instruction 612, the third PAD instruction 614, and the fourth PAD instruction 616 do not include mapping sections. As such, the first PAD instruction 610, the second PAD instruction 612, the third PAD instruction 614, and the fourth PAD instruction 616 will not be mapped to any functional unit. Thus, in addition to aligning an instruction packet that would otherwise be unaligned, the first PAD instruction 610, the second PAD instruction 612, the third PAD instruction 614, and the fourth PAD instruction 616 improve operation of programmable circuitry by conserving clock cycles that would otherwise be used to execute an instruction.

FIG. 7 illustrates an example instruction packet 700 including two PAD instructions. In the example of FIG. 7, the instruction packet 700 is a 64-bit instruction packet including four 16-bit instructions, two of which are PAD instructions. For example, the instruction packet 700 includes a first example instruction 702 to be executed by a functional unit and a second example instruction 704 to be executed by a functional unit. Additionally, for example, the instruction packet 700 includes a first example PAD instruction 706 and a second example PAD instruction 708.

In the illustrated example of FIG. 7, the first instruction 702, the second instruction 704, the first PAD instruction 706, and the second PAD instruction 708 reserve one bit to indicate whether an additional instruction is included in the instruction packet 700. For example, the $16^{th}$ bit of the first instruction 702, the second instruction 704, the first PAD instruction 706, and the second PAD instruction 708 indicate whether an instruction is the last instruction in the instruction packet 700. In the example of FIG. 7, a value of 1 as the $16^{th}$ bit of an instruction indicates that an additional instruction is included in an instruction packet. Conversely, in the example of FIG. 7, a value 0 as the $16^{th}$ bit of an instruction indicates that no additional instruction is included in an instruction packet.

As illustrated in the example of FIG. 7, the first PAD instruction 706 and the second PAD instruction 708 align an instruction packet following the instruction packet 700 with a 128-bit wide memory (e.g., the memory 308 of FIG. 3). For example, if an instruction packet following the instruction packet 700 is more than 32 bits in length, the instruction packet following the instruction packet 700 will be unaligned with the 128-bit wide memory. Advantageously, by including the first PAD instruction 706 and the second PAD instruction 708 in the instruction packet 700, examples described herein align an instruction packet following the instruction packet 700 with the 128-bit wide memory such that the following instruction packet can be accessed from the memory in one clock cycle.

In the illustrated example of FIG. 7, the first instruction 702 and the second instruction 704 include respective mapping sections that identify a functional unit to which the first instruction 702 and the second instruction 704 are to be assigned. Additionally, the first PAD instruction 706 and the second PAD instruction 708 do not include mapping sections. As such, the first PAD instruction 706 and the second PAD instruction 708 will not be mapped to any functional unit. Thus, in addition to aligning an instruction packet that would otherwise be unaligned, the first PAD instruction 706 and the second PAD instruction 708 improve operation of programmable circuitry by conserving clock cycles that would otherwise be used to execute an instruction.

Figure 8:
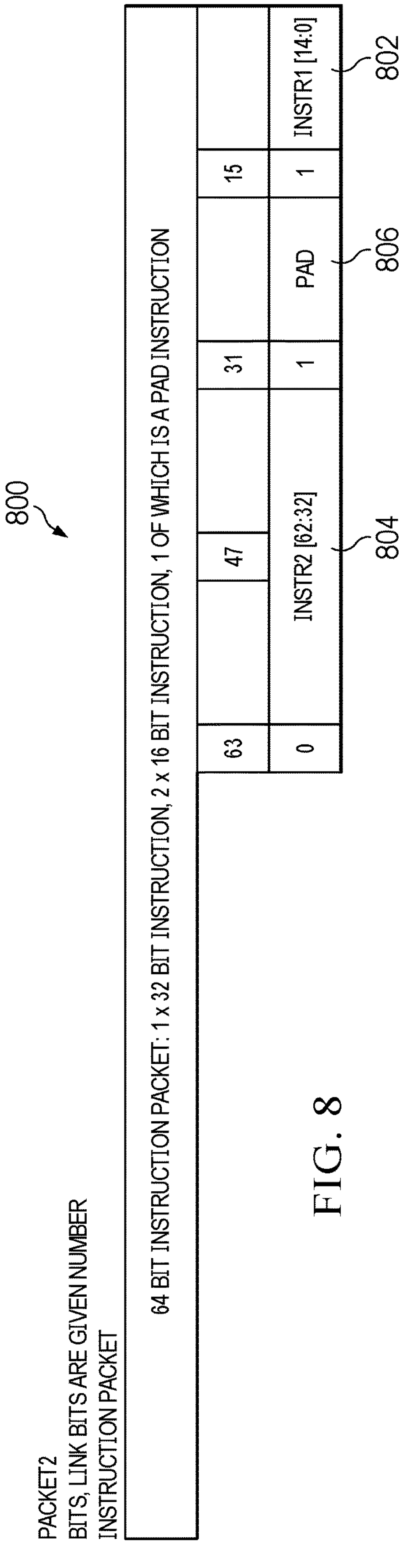
FIG. 8 illustrates an example instruction packet including one PAD instruction.

FIG. 8 illustrates an example instruction packet 800 including one PAD instruction. In the example of FIG. 8, the instruction packet 800 is a 64-bit instruction packet including one 32-bit instructions and two 16-bit instructions, one of which is a PAD instruction. For example, the instruction packet 800 includes a first example instruction 802 to be executed by a functional unit and a second example instruction 804 to be executed by a functional unit. Additionally, for example, the instruction packet 800 includes an example PAD instruction 806.

In the illustrated example of FIG. 8, the first instruction 802, the second instruction 804, and the PAD instruction 806 reserve one bit to indicate whether an additional instruction is included in the instruction packet 800. For example, the $16^{th}$ bit of the first instruction 802, the second instruction 804, and the PAD instruction 806 indicate whether an instruction is the last instruction in the instruction packet 800. In the example of FIG. 8, a value of 1 as the $16^{th}$ bit of an instruction indicates that an additional instruction is included in an instruction packet. Conversely, in the example of FIG. 8, a value 0 as the $16^{th}$ bit of an instruction indicates that no additional instruction is included in an instruction packet.

As illustrated in the example of FIG. 8, the PAD instruction 806 aligns an instruction packet following the instruction packet 800 with a 128-bit wide memory (e.g., the memory 308 of FIG. 3). For example, if an instruction packet following the instruction packet 800 is 64-bits in length, then the instruction packet following the instruction packet 800 will be unaligned with the 128-bit wide memory. Advantageously, by including the PAD instruction 806 in the instruction packet 800, examples described herein align an instruction packet following the instruction packet 800 with the 128-bit wide memory such that the following instruction packet can be accessed from the memory in one clock cycle.

In the illustrated example of FIG. 8, the first instruction 802 and the second instruction 804 include respective mapping sections that identify a functional unit to which the first instruction 802 and the second instruction 804 are to be assigned. Additionally, the PAD instruction 806 does not include a mapping section. As such, the PAD instruction 806 will not be mapped to any functional unit. Thus, in addition to aligning an instruction packet that would otherwise be unaligned, the PAD instruction 806 improves operation of programmable circuitry by conserving clock cycles that would otherwise be used to execute an instruction.

Returning to the illustrated example of FIG. 4, the functional units 410 are implemented by logic circuitry (e.g., sequential logic circuitry and/or combinational logic circuitry). In additional or alternative examples, the functional units 410 may be implemented by hardware, firmware, and/or software. In some examples, the functional units 410 include an ALU, an FPU, an AGU, an LSU, a FINTDIV unit, a TMU, and/or a VCU. In the example of FIG. 4, respective ones of the functional units 410 execute one or more instructions assigned to the respective ones of the functional units 410. For example, during a fourth clock cycle in which the packet decode circuitry 406 and the instruction mapping circuitry 408 decode and map an instruction to the first functional unit $\mathbf{410}_A$, the first functional unit $\mathbf{410}_A$ executes the instruction assigned to the first functional unit $\mathbf{410}_A$ when the instruction is provided by the instruction mapping circuitry 408.

Figure 9:
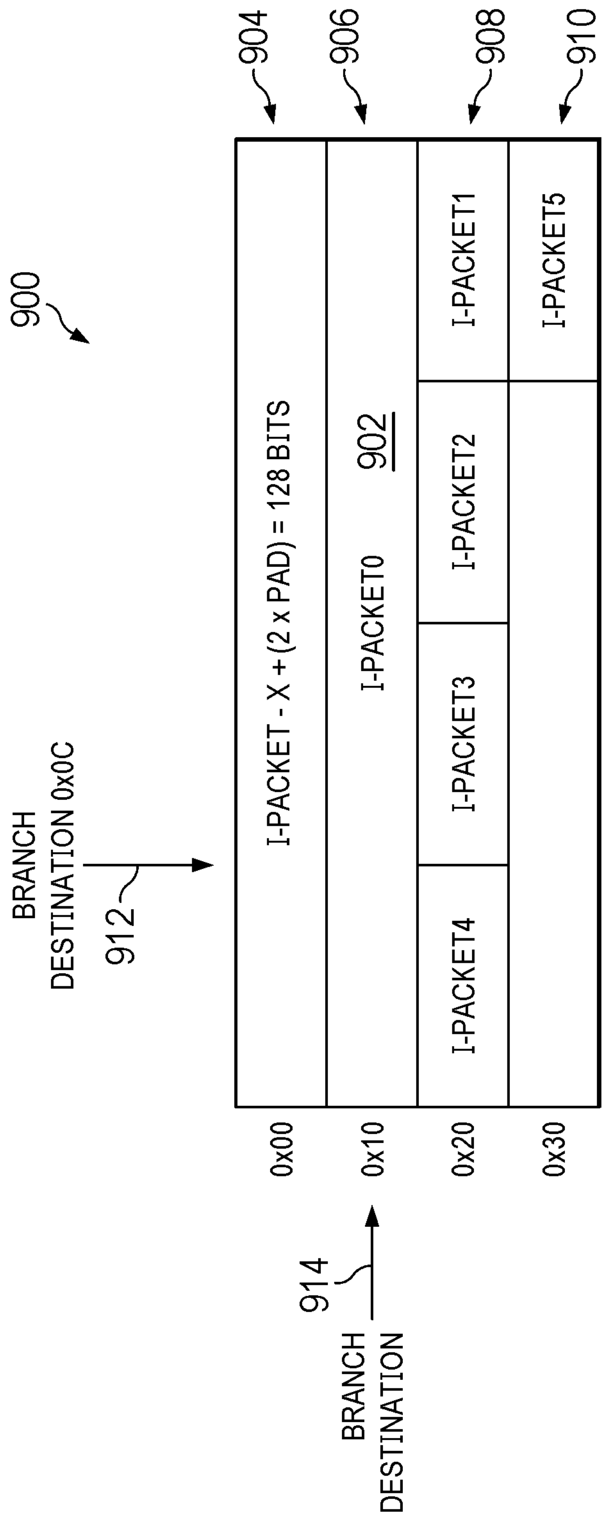
FIG. 9 illustrates an example memory including an example instruction packet that is aligned with the width of the memory via one or more PAD instructions.

FIG. 9 illustrates an example memory 900 including an example instruction packet 902 that is aligned with the width of the memory 900 via one or more PAD instructions. In the example of FIG. 9, the memory 900 includes a first example row 904, a second example row 906, a third example row 908, and a fourth example row 910. In the example of FIG. 9, the memory 900 is a byte addressable memory that is 128 bits (e.g., 16 bytes) wide where instruction packets are aligned to a 16-bit address boundary. In the example of FIG. 9, instruction packets are between 16 bits and 128 bits where individual instructions can vary in sizes of 16 bits, 32 bits, and 48 bits.

In the illustrated example of FIG. 9, the first row 904 starts at an address of 0x00 in hexadecimal representation (e.g., 0 in base 10 representation). Additionally, the second example row 906 starts at an address of 0x10 in hexadecimal representation (e.g., 16 in base 10 representation). In the example of FIG. 9, the third row 908 starts at an address of 0x20 in hexadecimal representation (e.g., 32 in base 10 representation). Additionally, the fourth example row 910 starts at an address of 0x30 in hexadecimal representation (e.g., 48 in base 10 representation). In the example of FIG. 9, pre-compile and/or pre-assembly, the instruction packet identified as I-PACKET-X may be a 12-byte (e.g., 96-bit) instruction packet resulting in the instruction packet 902 being unaligned with the width of the memory 900 pre-compile and/or pre-assembly (similar to the illustration of FIG. 1). As such, pre-compile and/or pre-assembly, the instructions of the instruction packet identified as I-PACKET-X include a number of bits that is less than the bit width of the memory 900 (e.g., 96 bits<128 bits).

In the illustrated example of FIG. 9, pre-compile and/or pre-assembly, the instruction packet 902 is associated with a branch instruction having an example first destination address 912 of 0x0C (e.g., 12 in base 10 representation). As such, without adjustment, an additional clock cycle would be expended to access the instruction packet 902 each time the branch instruction is reached (e.g., in a loop). Advantageously, a compiler and/or assembler inserts two 16-bit PAD instructions into the instruction packet identified as I-PACKET-X such that the instruction packet 902 is aligned with the width of the memory 900. As such, the two PAD instructions increase the number of bits in the instruction packet identified as I-PACKET-X to be equal to the bit width of the memory 900. Additionally, the compiler and/or assembler updates the branch instruction associated with the instruction packet 902 to have an example second destination address 914 of 0x10 (e.g., 16 in base 10 representation). Therefore, when programmable circuitry reaches the branch instruction of the instruction packet 902, the programmable circuitry will execute the instruction packet 902 in four clock cycles as compared to the five clock cycles expended to execute an unaligned instruction packet (e.g., the instruction packet 102 of FIG. 1).

For example, in the illustrated example of FIG. 9, after programmable circuitry processes the branch instruction associated with the instruction packet 902, the programmable circuitry requests data from the second destination address 914 of 0x10 during a first clock cycle. To do so, the programmable circuitry requests data in the second row 906 which includes the instruction packet 902. During a second clock cycle, the programmable circuitry receives the data in the second row 906. As the data in the second row 906 only includes the instruction packet 902, the programmable circuitry does not disregard any of the data from the second row 906.

In the illustrated example of FIG. 9, during a third clock cycle, the programmable circuitry attempts to dispatch the instruction packet 902 based on the data that was received during the second clock cycle. Because the instruction packet 902 (e.g., the entirety of the instruction packet 902) has been returned from the memory, the programmable circuitry successfully dispatches the instruction packet 902 during the third clock cycle. During a fourth clock cycle, the programmable circuitry executes the instruction packet 902.

As illustrated in the example of FIG. 9, because the instruction packet 902 is aligned with the width of the memory 900, the programmable circuitry can execute the aligned instruction packet in four clock cycles as compared to the at least five clock cycles expended to execute an unaligned instruction packet (e.g., the instruction packet 102 of FIG. 1).

Figure 10:
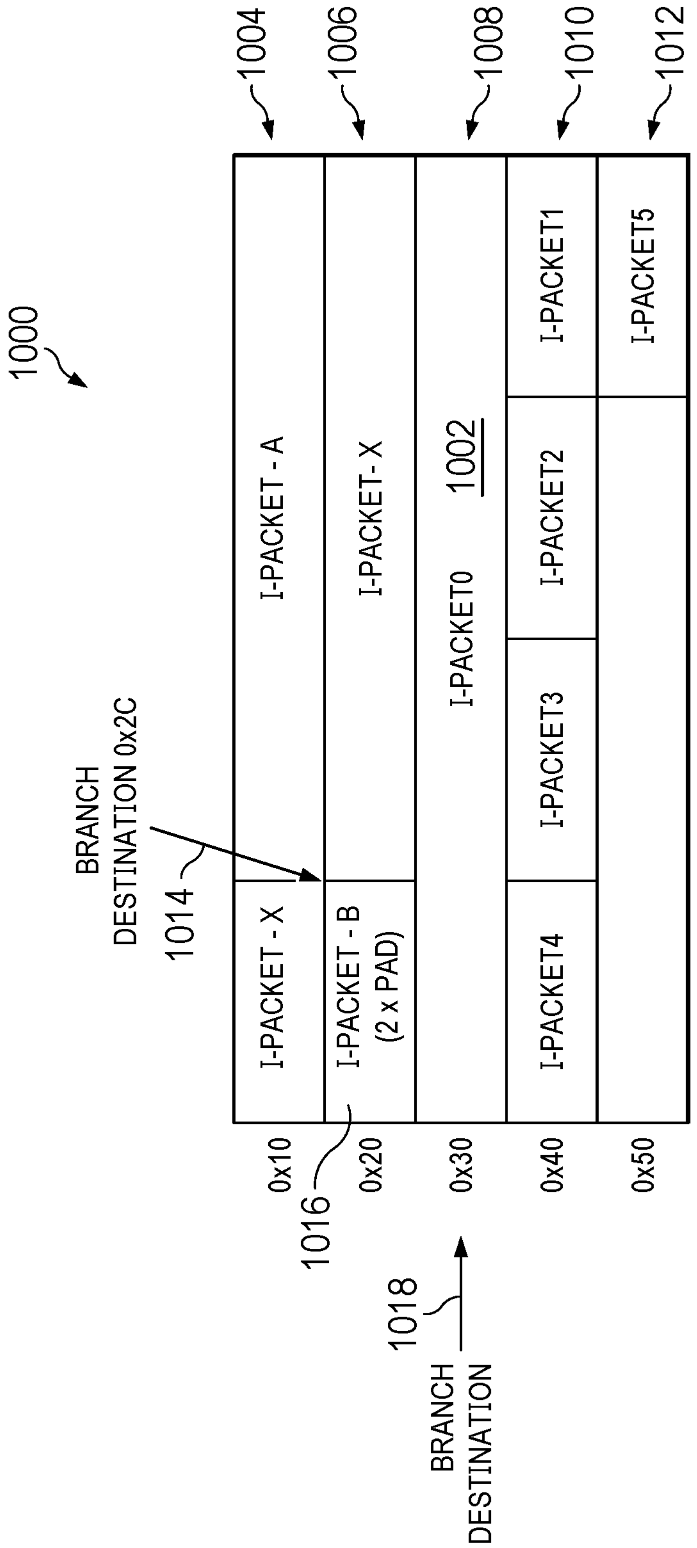
FIG. 10 illustrates an example memory including another example instruction packet that is aligned with the width of the memory via one or more PAD instructions.

FIG. 10 illustrates an example memory 1000 including another example instruction packet 1002 that is aligned with the width of the memory 1000 via one or more PAD instructions. In the example of FIG. 10, the memory 1000 includes a first example row 1004, a second example row 1006, a third example row 1008, a fourth example row 1010, and a fifth example row 1012. In the example of FIG. 10, the memory 1000 is a byte addressable memory that is 128 bits (e.g., 16 bytes) wide where instruction packets are aligned to a 16-bit address boundary. In the example of FIG. 10, instruction packets are between 16 bits and 128 bits where individual instructions can vary in sizes of 16 bits, 32 bits, and 48 bits.

In the illustrated example of FIG. 10, the first row 1004 starts at an address of 0x10 in hexadecimal representation (e.g., 16 in base 10 representation). Additionally, the second example row 1006 starts at an address of 0x20 in hexadecimal representation (e.g., 32 in base 10 representation). In the example of FIG. 10, the third row 1008 starts at an address of 0x30 in hexadecimal representation (e.g., 48 in base 10 representation). Additionally, the fourth example row 1010 starts at an address of 0x40 in hexadecimal representation (e.g., 64 in base 10 representation). In the example of FIG. 10, the fifth row 1012 starts at an address of 0x50 in hexadecimal representation (e.g., 80 in base 10 representation). In the example of FIG. 10, the instruction packet identified as I-PACKET-X is a 16-byte (e.g., 128-bit) instruction packet resulting in the instruction packet 1002 being unaligned with the width of the memory 1000 pre-compile and/or pre-assembly (similar to the illustration of FIG. 1).

In the illustrated example of FIG. 10, pre-compile and/or pre-assembly, the instruction packet 1002 is associated with a branch instruction having an example first destination address 1014 of 0x2C (e.g., 44 in base 10 representation). As such, without adjustment, an additional clock cycle would be expended to access the instruction packet 1002 each time the branch instruction is reached (e.g., in a loop). Advantageously, a compiler and/or assembler inserts an example PAD instruction packet 1016 (identified as I-PACKET-B) into the second row 1006 after the instruction packet identified as I-PACKET-X such that the instruction packet 1002 is aligned with the width of the memory 1000. In the example of FIG. 10, the PAD instruction packet 1016 includes two 16-bit PAD instructions. Additionally, the compiler and/or assembler updates the branch instruction associated with the instruction packet 1002 to have an example second destination address 1018 of 0x30 (e.g., 48 in base 10 representation). Therefore, when programmable circuitry reaches the branch instruction of the instruction packet 1002, the programmable circuitry will execute the instruction packet 1002 in four clock cycles as compared to the five clock cycles expended to execute an unaligned instruction packet (e.g., the instruction packet 102 of FIG. 1).

For example, in the illustrated example of FIG. 10, after programmable circuitry processes the branch instruction associated with the instruction packet 1002, the programmable circuitry requests data from the second destination address 1018 of 0x30 during a first clock cycle. To do so, the programmable circuitry requests data in the third row 1008 which includes the instruction packet 1002. During a second clock cycle, the programmable circuitry receives the data in the third row 1008. As the data in the third row 1008 only includes the instruction packet 1002, the programmable circuitry does not disregard any of the data from the third row 1008.

In the illustrated example of FIG. 10, during a third clock cycle, the programmable circuitry attempts to dispatch the instruction packet 1002 based on the data that was received during the second clock cycle. Because the instruction packet 1002 (e.g., the entirety of the instruction packet 1002) has been returned from the memory, the programmable circuitry successfully dispatches the instruction packet 1002 during the third clock cycle. During a fourth clock cycle, the programmable circuitry executes the instruction packet 1002. As illustrated in the example of FIG. 10, because the instruction packet 1002 is aligned with the width of the memory 1000, the programmable circuitry can execute the aligned instruction packet in four clock cycles as compared to the at least five clock cycles expended to execute an unaligned instruction packet (e.g., the instruction packet 102 of FIG. 1).

In the illustrated example of FIG. 10, the programmable circuitry may expend one extra clock cycle when executing a program associated with the instruction packets of FIG. 10. For example, because the instruction packet identified as I-PACKET-X is a 128-bit instruction packet, a compiler and/or an assembler may not insert one or more PAD instructions before the instruction packet identified as I-PACKET-X to align the instruction packet identified as I-PACKET-X with the width of the memory 1000. As such, when the programmable circuitry requests the instruction packet identified as I-PACKET-X, the programmable circuitry may expend two clock cycles to access the instruction packet identified as I-PACKET-X. However, the additional clock cycle expended to access the instruction packet identified as I-PACKET-X is a one-time cost because the instruction packet identified as I-PACKET-X is not associated with a discontinuity.

In some examples, a compiler and/or an assembler may also identify that the instruction packet identified as I-PACKET-X is misaligned with the width of the memory 1000 and insert one or more PAD instructions before the instruction packet identified as I-PACKET-X to align the instruction packet identified as I-PACKET-X with the width of the memory 1000. In such examples, the one or more PAD instructions inserted before the instruction packet identified as I-PACKET-X may cause the instruction packet 1002 to be aligned with the width of the memory 1000. As such, in such examples, the programmable circuitry may not expend additional clock cycles because the programmable circuitry can access the data in the first row 1004 in four clock cycles, the data in the second row 1006 in four clock cycles, and the data in the third row 1008 in four clock cycles.

As illustrated in FIGS. 4-10, PAD instructions inserted into the memory 308 allow instruction packets that would otherwise be unaligned with the width of the memory 308 of FIG. 3 to be aligned. As such, the bus master 302 (e.g., the fetch unit circuitry 402) does not waste clock cycles accessing more than one row of memory per instruction packet. Additionally, the bus master 302 (e.g., one or more of the functional units 410) can execute one or more instructions in a reduced number of clock cycles. For example, the bus master 302 (e.g., one or more of the functional units 410) ignores, discards, disregards, etc. PAD instructions and does not map PAD instructions to functional units of the bus master 302. As such, PAD instructions allow the bus master 302 (e.g., one or more of the functional units 410) to execute one or more instructions in a reduced number of clock cycles. For example, PAD instructions allow the bus master 302 (e.g., one or more of the functional units 410) to execute one or more instructions in a reduced number of clock cycles as compared to inserting NOP instructions into memory to compensate for an unaligned instruction packet.

While an example manner of implementing the bus master 302 of FIG. 3 is illustrated in FIG. 4, one or more of the elements, processes, and/or devices illustrated in FIG. 4 may be combined, divided, re-arranged, omitted, eliminated, and/or implemented in any other way. Further, the example fetch unit circuitry 402, the example instruction buffer 404, the example packet decode circuitry 406, the example instruction mapping circuitry 408, the example functional units 410, and/or, more generally, the example bus master 302 of FIG. 4, may be implemented by hardware alone or by hardware in combination with software and/or firmware. Thus, for example, any of the example fetch unit circuitry 402, the example instruction buffer 404, the example packet decode circuitry 406, the example instruction mapping circuitry 408, the example functional units 410, and/or, more generally, the example bus master 302 of FIG. 4, could be implemented by programmable circuitry in combination with machine-readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example bus master 302 of FIG. 4 may include one or more elements, processes, and/or devices in addition to, or instead of, those illustrated in FIG. 4, and/or may include more than one of any or all of the illustrated elements, processes, and devices.

Figure 11:
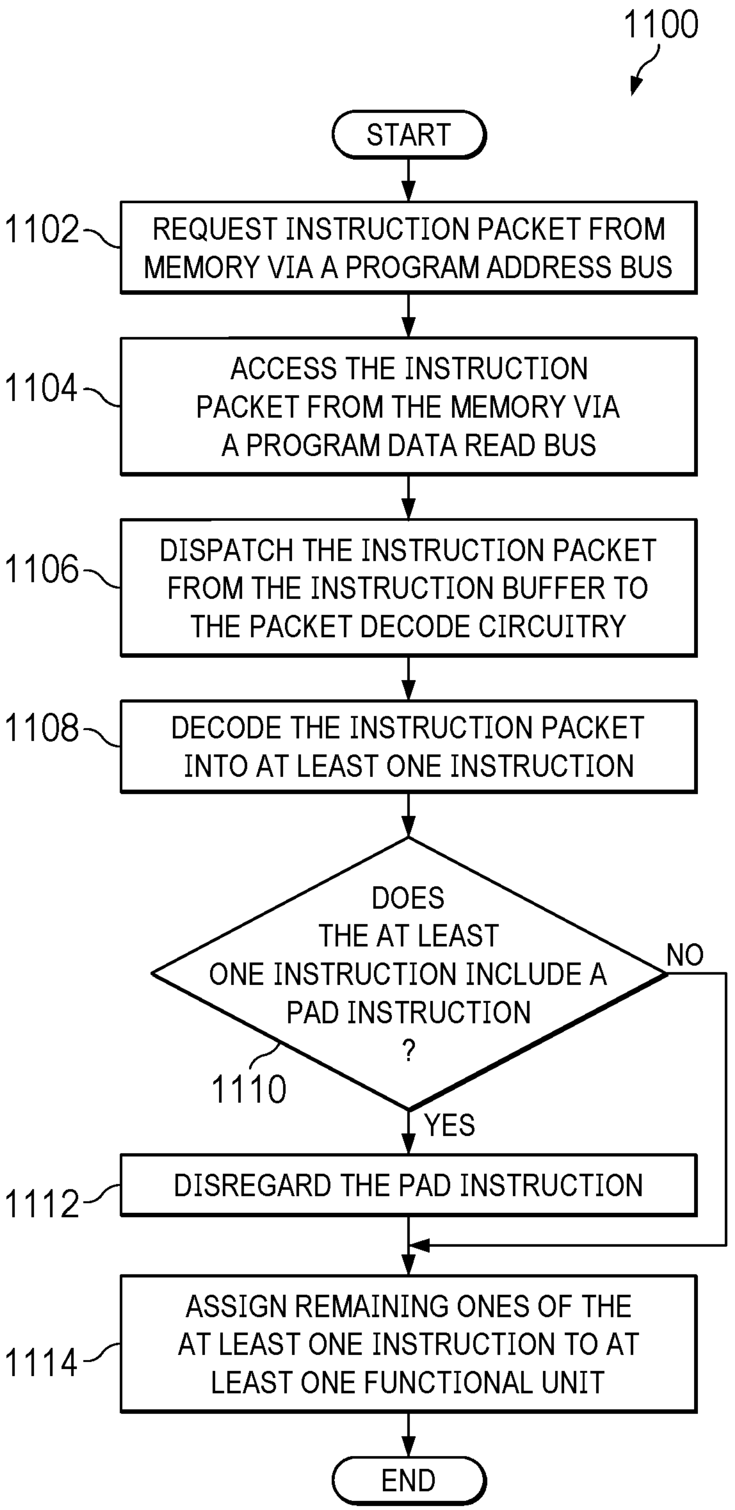
FIG. 11 is a flowchart representative of example machine-readable instructions and/or example operations that may be executed, instantiated, and/or performed using an example programmable circuitry implementation of the bus master of FIGS. 3 and/or 4.

A flowchart representative of example behavior of the bus master 302 of FIG. 4 is shown in FIG. 11. Operations in FIG. 11 may be performed by hardcoded circuitry, by programmable circuitry executing machine-readable instructions, or by a combination thereof. The machine-readable instructions may be one or more executable programs or portion(s) of one or more executable programs for execution by programmable circuitry such as the programmable circuitry 1212 shown in the example programmable circuitry platform 1200 described below in connection with FIG. 12 and/or may be one or more function(s) or portion(s) of functions to be performed by the example programmable circuitry (e.g., an FPGA). In some examples, the machine-readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer-readable and/or machine-readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer-readable and/or machine-readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer-readable storage medium may include one or more mediums. Further, although the example program is described with reference to the flowchart(s) illustrated in FIG. 11, many other methods of implementing the example bus master 302 of FIGS. 3 and/or 4 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine-readable instructions described herein may be stored in one or more of a compressed format, an encrypted format, a fragmented format, a compiled format, an executable format, a packaged format, etc. Machine-readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine-executable instructions. For example, the machine-readable instructions may be fragmented and stored on one or more storage devices, disks and/or computing devices (e.g., servers) located at the same or different locations of a network or collection of networks (e.g., in the cloud, in edge devices, etc.). The machine-readable instructions may be installed, modified, adapted, updated, combined, supplemented, configured, decrypted, decompressed, unpacked, distributed, reassigned, and/or compiled, etc., in order to make them directly-readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of computer-executable and/or machine-executable instructions that implement one or more functions and/or operations that may together form a program such as that described herein.

In another example, the machine-readable instructions may be stored in a state in which they may be read by programmable circuitry, but are augmented with a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable, computer-readable and/or machine-readable media, as used herein, may include instructions and/or program(s) regardless of the particular format or state of the machine-readable instructions and/or program(s).

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 11 may be implemented using executable instructions (e.g., computer-readable and/or machine-readable instructions) stored on one or more non-transitory computer-readable and/or machine-readable media. As used herein, the terms non-transitory computer-readable medium, non-transitory computer-readable storage medium, non-transitory machine-readable medium, and/or non-transitory machine-readable storage medium are expressly defined to include any type of computer-readable storage device and/or storage disk and to exclude propagating signals and to exclude transmission media. Examples of such non-transitory computer-readable medium, non-transitory computer-readable storage medium, non-transitory machine-readable medium, and/or non-transitory machine-readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer-readable storage device" and "non-transitory machine-readable storage device" are defined to include any physical (mechanical, magnetic and/or electrical) hardware to retain information for a time period, but to exclude propagating signals and to exclude transmission media. Examples of non-transitory computer-readable storage devices and/or non-transitory machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer-readable instructions, machine-readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 11 is a flowchart representative of example operations 1100 that may be executed, instantiated, and/or performed using example hardcoded and/or example programmable circuitry implementation of the bus master 302 of FIGS. 3 and/or 4. The example operations 1100 of FIG. 11 begin at block 1102, at which the fetch unit circuitry 402 requests an instruction packet from memory via a program address bus. For example, at block 1102, the fetch unit circuitry 402 requests an instruction packet from the memory 308 by requesting data at an address and/or in an address range in the memory 308 via the program bus 310.

In the illustrated example of FIG. 11, at block 1104, the fetch unit circuitry 402 accesses the instruction packet from the memory via a program data read bus. For example, at block 1104, the fetch unit circuitry 402 accesses the instruction packet from the memory 308 via the data read bus 312 and stores (e.g., causes storage of) the instruction packet in the instruction buffer 404. In the example of FIG. 11, an instruction packet may include one or more PAD instructions, one or more instructions that are to be mapped to a functional unit of the bus master 302, and/or a combination of one or more PAD instructions and one or more instructions that are to be mapped to a functional unit of the bus master 302. In the example of FIG. 11, at block 1106, the fetch unit circuitry 402 dispatches the instruction packet from the instruction buffer 404 to the packet decode circuitry 406. For example, at block 1106, the fetch unit circuitry 402 dispatches the one or more instructions of the instruction packet in opcode representation to the packet decode circuitry 406.

In the illustrated example of FIG. 11, at block 1108, the packet decode circuitry 406 decodes the instruction packet into at least one instruction. For example, at block 1108, the packet decode circuitry 406 decodes, converts, translates, etc. the at least one instruction of the instruction packet from opcode representation to data representation. Additionally, the packet decode circuitry 406 provides the at least one instruction of the instruction packet to the instruction mapping circuitry 408. In the example of FIG. 11, when the instruction packet includes a PAD instruction, the packet decode circuitry 406 only provides instructions that are not PAD instructions to the instruction mapping circuitry 408. Additionally or alternatively, PAD instructions may be provided, and the instruction mapping circuitry 408 may discard the PAD instruction without providing the PAD instructions to the functional units 410.

In examples where PAD instructions may be provided to the instruction mapping circuitry 408, at block 1110, the instruction mapping circuitry 408 determines whether the at least one instruction includes a PAD instruction. For example, at block 1110, the instruction mapping circuitry 408 parses the at least one instruction to determine whether each instruction includes information indicative of a functional unit to which the instruction is to be assigned. Based on the instruction mapping circuitry 408 determining that an instruction does not include information indicative of a functional unit to which the instruction is to be assigned, the instruction mapping circuitry 408 determines that the instruction is a PAD instruction.

Additionally or alternatively, at block 1110, the instruction mapping circuitry 408 parses the at least one instruction to identify respective mapping sections of the at least one instruction and determines whether the respective mapping sections correspond to a functional unit to which the at least one instruction is to be assigned. Based on the instruction mapping circuitry 408 determining that a mapping section of an instruction does not correspond to a functional unit, the instruction mapping circuitry 408 determines that the instruction is a PAD instruction. In some examples, a PAD instruction does not include a mapping section. As such, based on the instruction mapping circuitry 408 determining that an instruction does not include a mapping section, the instruction mapping circuitry 408 determines that the instruction is a PAD instruction.

As described above, in some examples, the instruction mapping circuitry 408 is implemented by multiple instances of the instruction mapping circuitry 408. In such examples, the multiple instances of the instruction mapping circuitry 408 can be implemented by multiple instruction mapping circuits associated with respective functional units of the functional units 410. For example, at block 1110, a first instruction mapping circuit associated with the first functional unit $\mathbf{410}_A$ parses an instruction for first information corresponding to the first functional unit $\mathbf{410}_A$ and disregards (e.g., at block 1112) an instruction (e.g., a PAD instruction) based on the instruction not including the first information corresponding to the first functional unit $\mathbf{410}_A$. Additionally, for example, at block 1110, a second instruction mapping circuit associated with the second functional unit $\mathbf{410}_B$ parses an instruction for second information corresponding to the second functional unit $\mathbf{410}_B$ and disregards (e.g., at block 1112) an instruction (e.g., a PAD instruction) based on the instruction not including the second information corresponding to the second functional unit $\mathbf{410}_B$. As such, the multiple instances of the instruction mapping circuitry 408 disregard PAD instructions, which do not include information that would cause the PAD instructions to be mapped to any of the functional units 410.

In the illustrated example of FIG. 11, based on (e.g., in response to) the instruction mapping circuitry 408 determining that the at least one instruction includes a PAD instruction (block 1110: YES), the operations 1100 proceed to block 1112. Based on (e.g., in response to) the instruction mapping circuitry 408 determining that the at least one instruction does not include a PAD instruction (block 1110: NO), the operations 1100 proceed to block 1114. At block 1112, the instruction mapping circuitry 408 disregards the PAD instruction. For example, at block 1112, the instruction mapping circuitry 408 does not assign (e.g., map) the PAD instruction to any of the functional units 410.

In the illustrated example of FIG. 11, at block 1114, the instruction mapping circuitry 408 assigns remaining ones of the at least one instruction to at least one functional unit. For example, at block 1114, the instruction mapping circuitry assigns remaining ones of the at least one instruction to at least one of the functional units 410 based on the information indicative of the functional unit(s) to which the remaining ones of the at least one instruction corresponds (e.g., the mapping section of the remaining ones of the at least one instruction). In some examples, the at least one instruction may not include any remaining instructions after PAD instructions are disregarded. For example, an instruction packet may only include one PAD instruction, or an instruction packet may only include multiple PAD instructions. In such examples, block 1114 may be omitted.

As illustrated in FIG. 11, if an instruction packet includes a PAD instruction, the instruction mapping circuitry 408 disregards the pad instruction during instruction assignment to at least one functional unit. For example, the bus master 302 may operate in an instruction assignment mode of operation that starts when the instruction mapping circuitry 408 evaluates whether one or more instructions of an instruction packet include information (e.g., mapping sections) indicative of functional unit(s) to which the one or more instructions are to be assigned and concludes when the instruction mapping circuitry 408 has disregarded and/or assigned to a functional unit, all of the one or more instructions in the instruction packet. The operations 1100 may be repeated for each instruction packet of a program.

Figure 12:
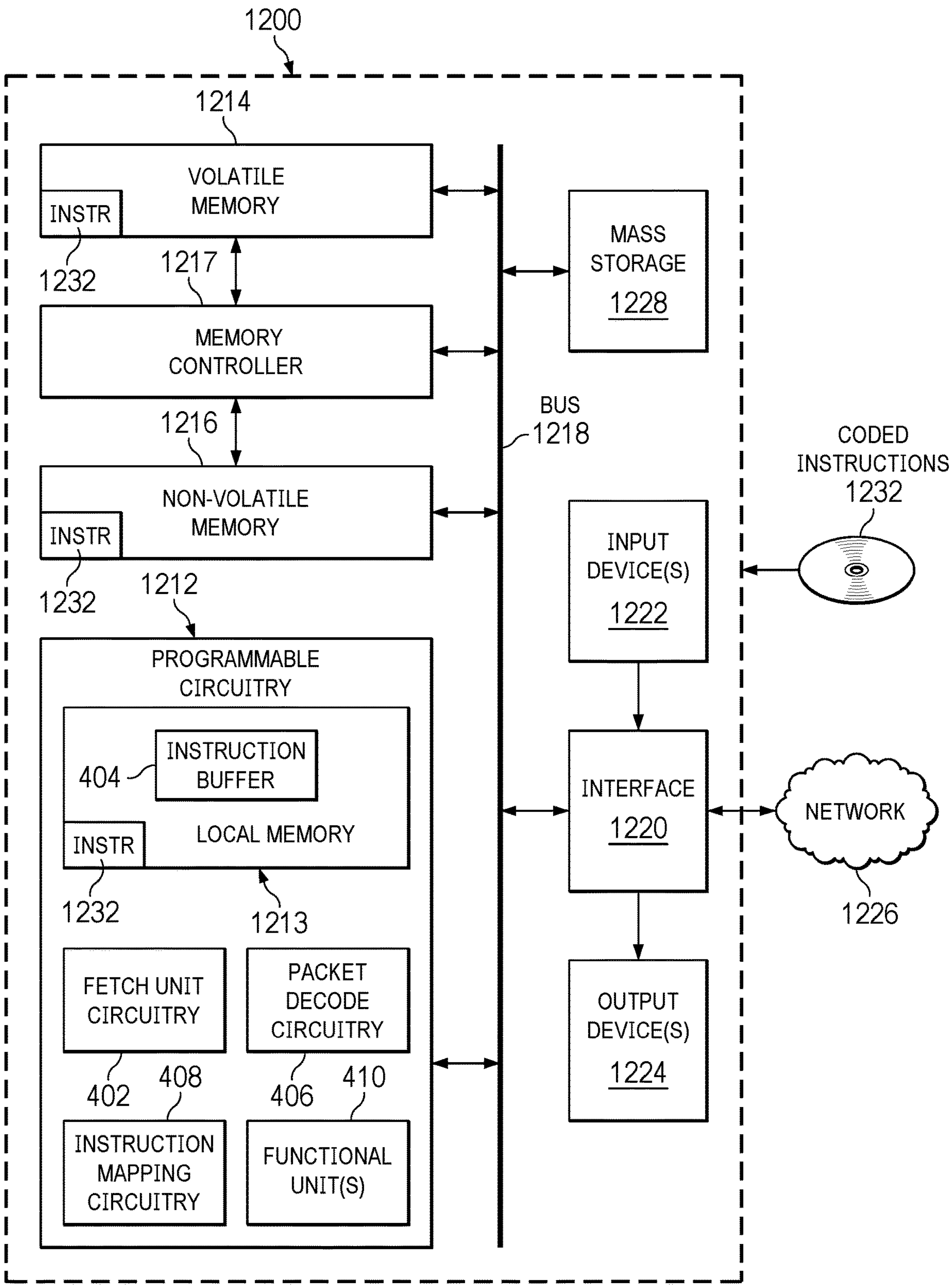
FIG. 12 is a block diagram of an example processing platform including programmable circuitry structured to execute, instantiate, and/or perform the example machine-readable instructions and/or perform the example operations of FIG. 11 to implement the bus master of FIGS. 3 and/or 4.

FIG. 12 is a block diagram of an example programmable circuitry platform 1200 structured to execute and/or instantiate the example machine-readable instructions and/or the example operations of FIG. 11 to implement the bus master 302 of FIGS. 3 and/or 4. The programmable circuitry platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device. In some examples, the programmable circuitry platform 1200 can be implemented as an SoC. In such examples, the programmable circuitry platform 1200 can be implemented by digital logic circuitry such as sequential logic circuitry and/or combinational logic circuitry.

The programmable circuitry platform 1200 of the illustrated example includes programmable circuitry 1212. The programmable circuitry 1212 of the illustrated example is hardware. For example, the programmable circuitry 1212 can be implemented by digital logic circuitry such as sequential logic circuitry and/or combinational logic circuitry. In some examples, the programmable circuitry 1212 can be implemented by one or more integrated circuits, logic circuits, FPGAs, microprocessors, CPUs, GPUs, DSPs, and/or microcontrollers from any desired family or manufacturer. The programmable circuitry 1212 may be implemented by one or more semiconductor based (e.g., silicon based) devices. In this example, the programmable circuitry 1212 implements the example fetch unit circuitry 402, the example packet decode circuitry 406, the example instruction mapping circuitry 408, and the example functional units 410.

The programmable circuitry 1212 of the illustrated example includes a local memory 1213 (e.g., a cache, registers, etc.). In this example, the local memory 1213 implements the instruction buffer 404. The programmable circuitry 1212 of the illustrated example is in communication with main memory 1214, 1216, which includes a volatile memory 1214 and a non-volatile memory 1216, by a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1216 may be implemented by flash memory and/or any other desired type of memory device. Access to the main memory 1214, 1216 of the illustrated example is controlled by a memory controller 1217. In some examples, the memory controller 1217 may be implemented by one or more integrated circuits, logic circuits, microcontrollers from any desired family or manufacturer, or any other type of circuitry to manage the flow of data going to and from the main memory 1214, 1216.

The programmable circuitry platform 1200 of the illustrated example also includes interface circuitry 1220. The interface circuitry 1220 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1222 are connected to the interface circuitry 1220. The input device(s) 1222 permit(s) a user (e.g., a human user, a machine user, etc.) to enter data and/or commands into the programmable circuitry 1212. The input device(s) 1222 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1224 are also connected to the interface circuitry 1220 of the illustrated example. The output device(s) 1224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1220 of the illustrated example, thus, typically includes a graphics driver card, a graphics driver chip, and/or graphics processor circuitry such as a GPU.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1200 of the illustrated example also includes one or more mass storage discs or devices 1228 to store firmware, software, and/or data.

Examples of such mass storage discs or devices 1228 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine-readable instructions 1232, which may be implemented by the machine-readable instructions of FIG. 11, may be stored in the mass storage device 1228, in the volatile memory 1214, in the non-volatile memory 1216, and/or on at least one non-transitory computer-readable storage medium such as a CD or DVD which may be removable.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Numerical identifiers such as "first," "second," "third," etc. are used merely to distinguish between elements of substantially the same type in terms of structure and/or function. These identifiers, as used in the detailed description, do not necessarily align with those used in the claims.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal," "node," "interconnection," "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor. While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value, or, if the value is zero, a reasonable range of values around zero.

Modifications are possible in the described embodiments, and other embodiments are possible, within the scope of the claims.

From the foregoing, it will be appreciated that example systems, apparatus, articles of manufacture, and methods have been described that align address boundaries in memory. Example systems, apparatus, articles of manufacture, and methods described herein reduce the number of clock cycles expended to read data (e.g., instruction packets) from memory. Additionally, examples described herein do not assign PAD instructions to a functional unit and do not expend a clock cycle to execute an instruction that is included for purposes of memory alignment. Described systems, apparatus, articles of manufacture, and methods improve the efficiency of using a computing device by reducing the number of clock cycles expended to read and execute instructions which improves the performance of a computing device by reducing power consumption. Described systems, apparatus, articles of manufacture, and methods are accordingly directed to one or more improvement(s) in the operation of a machine such as a computer or other electronic and/or mechanical device.

The following claims are hereby incorporated into this Detailed Description by this reference. Although certain example systems, apparatus, articles of manufacture, and methods have been described herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:

packet decode circuitry configurable to decode an instruction packet into at least one instruction;

programmable circuitry including a first functional unit and a second functional unit; and instruction mapping circuitry including:

a first instruction mapping circuit configurable to:

parse a pad instruction included in the at least one instruction to determine whether the pad instruction includes first information corresponding to the first functional unit; and disregard the pad instruction based on the pad instruction not including the first information corresponding to the first functional unit; and a second instruction mapping circuit configurable to:

parse the pad instruction to determine whether the pad instruction includes second information corresponding to the second functional unit; and disregard the pad instruction based on the pad instruction not including the second information corresponding to the second functional unit.

2. The apparatus of claim 1, wherein the at least one instruction includes the pad instruction and a second instruction, and the instruction mapping circuitry is configurable to disregard the pad instruction during instruction assignment of the second instruction to at least one functional unit of the programmable circuitry.

3. The apparatus of claim 1, wherein the instruction mapping circuitry is configurable to determine whether information included in the pad instruction indicates that the pad instruction is assigned to any functional unit of the programmable circuitry.

4. The apparatus of claim 1, wherein the at least one instruction includes the pad instruction and a second instruction, and the instruction mapping circuitry is configurable to:

parse the at least one instruction to identify a first mapping section of the pad instruction and a second mapping section of the second instruction, the second mapping section indicative of the first functional unit to which the second instruction is to be assigned; and disregard the pad instruction based on the first mapping section including information that does not correspond to any functional unit of the programmable circuitry.

5. The apparatus of claim 1, wherein the at least one instruction includes the pad instruction and a second instruction, and the instruction mapping circuitry is configurable to:

parse the at least one instruction to identify a first mapping section of the second instruction, the first mapping section indicative of the first functional unit to which the second instruction is to be assigned; and disregard the pad instruction based on the pad instruction not including a second mapping section.

6. The apparatus of claim 1, wherein:

the instruction packet is a first instruction packet;

the apparatus further includes fetch unit circuitry and a memory, the memory configurable to store the first instruction packet and a second instruction packet;

the pad instruction causes the second instruction packet to be aligned to a bit width of the memory; and the fetch unit circuitry is configurable to access the second instruction packet from the memory in one clock cycle based on the pad instruction aligning the second instruction packet to the bit width of the memory.

7. The apparatus of claim 1, wherein:

the packet decode circuitry is configurable to insert the pad instruction in the at least one instruction based on a discontinuity in the instruction packet.

8. The apparatus of claim 1, wherein the programmable circuitry is based on a Very-Long Instruction Word architecture.

9. The apparatus of claim 8, wherein the pad instruction is a first pad instruction, and the instruction packet includes a second pad instruction.

10. A method comprising:

decoding, by packet decode circuitry, an instruction packet into at least one instruction;

parsing, by a first instruction mapping circuit of instruction mapping circuitry, a pad instruction included in the at least one instruction to determine whether the pad instruction includes first information corresponding to a first functional unit of programmable circuitry;

disregarding, by the first instruction mapping circuit, the pad instruction based on the pad instruction not including the first information corresponding to the first functional unit;

parsing, by a second instruction mapping circuit of the instruction mapping circuitry, the pad instruction to determine whether the pad instruction includes second information corresponding to a second functional unit of the programmable circuitry; and disregarding, by the second instruction mapping circuit, the pad instruction based on the pad instruction not including the second information corresponding to the second functional unit.

11. The method of claim 10, wherein the at least one instruction includes the pad instruction and a second instruction, and the method further includes disregarding the pad instruction during instruction assignment of the second instruction to at least one functional unit of the programmable circuitry.

12. The method of claim 10, further including determining whether information included in the pad instruction indicates that the pad instruction is assigned to any functional unit of the programmable circuitry.

13. The method of claim 10, wherein the at least one instruction includes the pad instruction and a second instruction, and the method further includes:

parsing the at least one instruction to identify a first mapping section of the pad instruction and a second mapping section of the second instruction, the second mapping section indicative of the first functional unit to which the second instruction is to be assigned; and disregarding the pad instruction based on the first mapping section including information that does not correspond to any functional unit of the programmable circuitry.

14. The method of claim 10, wherein the at least one instruction includes the pad instruction and a second instruction, and the method further includes:

parsing the at least one instruction to identify a first mapping section of the second instruction, the first mapping section indicative of the first functional unit to which the second instruction is to be assigned; and disregarding the pad instruction based on the pad instruction not including a second mapping section.

15. The method of claim 10, wherein the instruction packet is a first instruction packet, and the method further includes accessing a second instruction packet from a memory in one clock cycle based on the pad instruction aligning the second instruction packet to a bit width of the memory, the memory to store the first instruction packet and the second instruction packet.

16. The method of claim 10, further including:

inserting the pad instruction in the at least one instruction based on a discontinuity in the instruction packet.

17. The method of claim 10, wherein the programmable circuitry is based on a Very-Long Instruction Word architecture.

18. The method of claim 17, wherein the pad instruction is a first pad instruction, and the instruction packet includes a second pad instruction.

19. A system comprising:

memory;

a memory controller coupled to the memory, the memory controller configurable to retrieve an instruction from the memory;

an address decoder coupled to the memory controller, the address decoder configurable to produce an instruction packet based on the instruction;

a bus master coupled to the memory controller, the bus master comprising:

fetch circuitry coupled to the memory controller, the fetch circuitry configurable to receive the instruction packet;

packet decode circuitry coupled to the fetch circuitry, the packet decode circuitry configurable to decode the instruction packet into at least one instruction;

programmable circuitry including a first functional unit and a second functional unit; and instruction mapping circuitry including:

a first instruction mapping circuit configurable to:

parse a pad instruction included in the at least one instruction to determine whether the pad instruction includes first information corresponding to the first functional unit; and disregard the pad instruction based on the pad instruction not including the first information corresponding to the first functional unit; and a second instruction mapping circuit configurable to:

parse the pad instruction to determine whether the pad instruction includes second information corresponding to the second functional unit; and disregard the pad instruction based on the pad instruction not including the second information corresponding to the second functional unit.

* * * * *